United States Patent
Wachsman et al.

(10) Patent No.: US 11,939,224 B2
(45) Date of Patent: Mar. 26, 2024

(54) ORDERED POROUS SOLID ELECTROLYTE STRUCTURES, ELECTROCHEMICAL DEVICES WITH SAME, METHODS OF MAKING SAME

(71) Applicant: UNIVERSITY OF MARYLAND, COLLEGE PARK, College Park, MD (US)

(72) Inventors: Eric D Wachsman, Fulton, MD (US); Dennis McOwen, Washington, DC (US); Yunhui Gong, Clarksville, MD (US); Yang Wen, Tempe, AZ (US)

(73) Assignee: University of Maryland, College Park, College Park, MD (US)

( * ) Notice: Subject to any disclaimer, the term of this patent is extended or adjusted under 35 U.S.C. 154(b) by 828 days.

(21) Appl. No.: 16/970,336

(22) PCT Filed: Feb. 15, 2019

(86) PCT No.: PCT/US2019/018349
§ 371 (c)(1),
(2) Date: Aug. 14, 2020

(87) PCT Pub. No.: WO2019/161301
PCT Pub. Date: Aug. 22, 2019

(65) Prior Publication Data
US 2021/0083320 A1    Mar. 18, 2021

Related U.S. Application Data

(60) Provisional application No. 62/631,324, filed on Feb. 15, 2018.

(51) Int. Cl.
*C01B 33/22* (2006.01)
*B22F 10/25* (2021.01)
(Continued)

(52) U.S. Cl.
CPC .............. *C01B 33/22* (2013.01); *B22F 10/25* (2021.01); *B22F 10/34* (2021.01); *B22F 10/38* (2021.01);
(Continued)

(58) Field of Classification Search
CPC ......... C01B 33/22; C01B 25/45; B22F 10/25; B22F 10/34; B22F 10/38; B33Y 10/00;
(Continued)

(56) References Cited

U.S. PATENT DOCUMENTS

| 4,582,621 A | 4/1986 | Bell et al. |
| 4,957,673 A | 9/1990 | Schroeder et al. |

(Continued)

FOREIGN PATENT DOCUMENTS

| CN | 1333576 A | 1/2002 |
| CN | 101933100 A | 12/2010 |

(Continued)

OTHER PUBLICATIONS

Abstract from Murugan, R. Thangadurai, V., abd Weppner, W. (2007), Fast Lithium Ion Conduction in Garnet-Type Li7La3Zr2O12. Angewandte Chemie, International Edition, 46: 7778-7781 presented in EPO opposition related to EP Patent No. 2976798.

(Continued)

*Primary Examiner* — Gary D Harris
(74) *Attorney, Agent, or Firm* — Honigman LLP; Andrew N. Weber

(57) ABSTRACT

Provided are solid-state electrolyte structures. The solid-state electrolyte structures are ion-conducting materials. The solid-state electrolyte structures may be formed by 3-D printing using 3-D printable compositions. 3-D printable compositions may include ion-conducting materials and at least one dispersant, a binder, a plasticizer, or a solvent or any combination of one or more dispersant, binder, plasti- (Continued)

cizer, or solvent. The solid-state electrolyte structures can be used in electrochemical devices.

14 Claims, 18 Drawing Sheets

(51) Int. Cl.
| | |
|---|---|
| *B22F 10/34* | (2021.01) |
| *B22F 10/38* | (2021.01) |
| *B33Y 10/00* | (2015.01) |
| *B33Y 70/00* | (2020.01) |
| *B33Y 80/00* | (2015.01) |
| *C01B 25/45* | (2006.01) |
| *C01F 7/028* | (2022.01) |
| *C01G 25/00* | (2006.01) |
| *H01M 10/0525* | (2010.01) |
| *H01M 10/0562* | (2010.01) |

(52) U.S. Cl.
CPC ............... *B33Y 10/00* (2014.12); *B33Y 70/00* (2014.12); *B33Y 80/00* (2014.12); *C01B 25/45* (2013.01); *C01F 7/028* (2013.01); *C01G 25/006* (2013.01); *H01M 10/0525* (2013.01); *H01M 10/0562* (2013.01); *C01P 2002/30* (2013.01); *C01P 2002/72* (2013.01); *C01P 2004/02* (2013.01); *C01P 2004/03* (2013.01); *C01P 2006/40* (2013.01); *H01M 2300/0077* (2013.01)

(58) Field of Classification Search
CPC ......... B33Y 70/00; B33Y 80/00; C01F 7/028; C01G 25/006; H01M 10/0525; H01M 10/0562; H01M 2300/0077; H01M 4/386; H01M 4/387; H01M 4/5815; H01M 4/583; H01M 2300/0068; H01M 2300/0094; H01M 2300/0082; H01M 4/381; H01M 4/382; H01M 4/485; H01M 4/58; H01M 4/581; H01M 4/5825; H01M 8/1018; H01M 4/505; H01M 10/054; H01M 12/00; H01M 4/0428; H01M 4/13; H01M 4/131; H01M 4/134; H01M 8/1069; H01M 10/052; H01M 10/056; H01M 12/06; H01M 12/08; H01M 2300/0071; C01P 2002/30; C01P 2002/72; C01P 2004/02; C01P 2004/03; C01P 2006/40; Y02E 60/10; Y02E 60/50; Y02P 10/25; Y02P 70/50; C04B 35/6263; C04B 2235/5445; C04B 35/6264; C04B 35/632; C04B 35/63408; C04B 35/6342; C04B 35/63424; C04B 35/6365; C04B 2235/3206; C04B 35/447; C04B 2235/3213; C04B 35/486; C04B 35/495; C04B 2235/3203; C04B 2235/3208; C04B 2235/3215; C04B 2235/3225; C04B 2235/3227; C04B 2235/3244; C04B 2235/3251; C04B 2235/3284; C04B 2235/3418; C04B 2235/6026; C04B 2235/764; H01B 1/08
USPC ........................................................ 429/322
See application file for complete search history.

(56) References Cited

U.S. PATENT DOCUMENTS

| | | |
|---|---|---|
| 5,294,503 A | 3/1994 | Huang et al. |
| 5,342,710 A | 8/1994 | Koksbang |
| 5,434,021 A | 7/1995 | Fauteux et al. |
| 5,580,430 A | 12/1996 | Balagopal et al. |
| 5,589,296 A | 12/1996 | Iwamoto et al. |
| 5,894,656 A | 4/1999 | Menon et al. |
| 6,218,049 B1 | 4/2001 | Bates |
| 6,447,712 B1 | 9/2002 | Dogan |
| 6,940,628 B2 | 9/2005 | Giron et al. |
| 7,060,205 B2 | 7/2006 | Monden et al. |
| 7,070,632 B1 | 7/2006 | Visco |
| 7,713,466 B2 | 5/2010 | Omori et al. |
| 8,227,105 B1 | 7/2012 | Gerald, II et al. |
| 8,304,115 B1 * | 11/2012 | Petkov ............ H01M 10/0562 429/304 |
| 8,940,446 B1 | 1/2015 | Holme et al. |
| 9,252,455 B1 | 2/2016 | Liu et al. |
| 9,548,512 B2 | 1/2017 | Liang |
| 9,590,228 B1 | 3/2017 | Wang et al. |
| 10,615,452 B2 | 4/2020 | Song et al. |
| 10,622,666 B2 | 8/2020 | Wachsman |
| 10,971,761 B2 | 4/2021 | Hu et al. |
| 2002/0136945 A1 | 9/2002 | Call |
| 2002/0182508 A1 | 12/2002 | Nimon et al. |
| 2003/0190520 A1 | 10/2003 | Amine |
| 2004/0096737 A1 | 5/2004 | Kim et al. |
| 2004/0191617 A1 | 9/2004 | Visco et al. |
| 2005/0008938 A1 | 1/2005 | Cho et al. |
| 2005/0175900 A1 | 8/2005 | Yasuda et al. |
| 2006/0026813 A1 | 11/2006 | Seabaugh et al. |
| 2006/0269813 A1 | 11/2006 | Seabaugh et al. |
| 2007/0048617 A1 | 3/2007 | Inda |
| 2007/0138020 A1 | 6/2007 | Balagopal et al. |
| 2007/0148553 A1 | 6/2007 | Weppner |
| 2008/0118826 A1 | 5/2008 | Shimamura et al. |
| 2008/0118836 A1 | 5/2008 | Hwang |
| 2008/0138710 A1 | 6/2008 | Liaw et al. |
| 2008/0182147 A1 | 7/2008 | Blake |
| 2008/0241665 A1 | 10/2008 | Sano |
| 2008/0286625 A1 | 11/2008 | Sarker et al. |
| 2009/0061313 A1 | 3/2009 | Tadano |
| 2009/0136830 A1 | 5/2009 | Gordon |
| 2009/0197182 A1 | 8/2009 | Katoh |
| 2009/0226790 A1 | 9/2009 | Kanamura |
| 2009/0226816 A1 | 9/2009 | Yoshida |
| 2010/0216032 A1 | 8/2010 | Baba et al. |
| 2010/0308253 A1 | 12/2010 | Swift |
| 2010/0331170 A1 | 12/2010 | Balagopal |
| 2011/0104526 A1 | 5/2011 | Boxley et al. |
| 2011/0149473 A1 | 6/2011 | Eilertsen |
| 2011/0206980 A1 | 8/2011 | Yerramalli |
| 2011/0244337 A1 | 10/2011 | Ohta |
| 2012/0021297 A1 | 1/2012 | Hauser |
| 2012/0199785 A1 | 8/2012 | Saka |
| 2012/0264017 A1 | 10/2012 | Nazri et al. |
| 2013/0004830 A1 | 1/2013 | Song |
| 2013/0202960 A1 | 8/2013 | Kim |
| 2013/0216903 A1 | 8/2013 | Pitteloud |
| 2013/0216910 A1 | 8/2013 | Obrovac |
| 2013/0260257 A1 | 10/2013 | Choi |
| 2013/0295469 A1 | 11/2013 | Liang et al. |
| 2013/0323603 A1 | 12/2013 | Ryu |
| 2014/0038054 A1 | 2/2014 | Tojigamori |
| 2014/0080006 A1 | 3/2014 | Ogasa |
| 2014/0170465 A1 | 6/2014 | Visco et al. |
| 2014/0223730 A1 | 8/2014 | Larsen |
| 2014/0272595 A1 | 9/2014 | Cristadoro et al. |
| 2014/0287305 A1 | 9/2014 | Wachsman et al. |
| 2014/0299820 A1 | 10/2014 | Harandek et al. |
| 2014/0315101 A1 | 10/2014 | Jansohn et al. |
| 2015/0044575 A1 | 2/2015 | Kawaji et al. |
| 2015/0050543 A1 | 2/2015 | Christensen et al. |
| 2015/0056519 A1 | 2/2015 | Ohta |
| 2015/0056520 A1 | 2/2015 | Thokchom |
| 2015/0064537 A1 | 3/2015 | Christensen et al. |
| 2015/0099188 A1 | 4/2015 | Holme |
| 2015/0099190 A1 | 4/2015 | Holme |
| 2015/0111110 A1 | 4/2015 | Watanabe et al. |
| 2015/0147659 A1 | 5/2015 | Kato |
| 2015/0229000 A1 | 8/2015 | Shao et al. |
| 2015/0311562 A1 | 10/2015 | Le Van-Jodin et al. |

(56) References Cited

U.S. PATENT DOCUMENTS

| | | | |
|---|---|---|---|
| 2016/0028103 | A1 | 1/2016 | Yokoyama |
| 2016/0141580 | A1 | 5/2016 | Sommer et al. |
| 2016/0167132 | A1 | 6/2016 | Panat |
| 2016/0204427 | A1 | 7/2016 | Vereecken |
| 2016/0351973 | A1 | 12/2016 | Albano |
| 2016/0372729 | A1 | 12/2016 | Archer |
| 2017/0005367 | A1 | 1/2017 | Van Berkel |
| 2017/0022112 | A1 | 1/2017 | Karpenko |
| 2017/0098824 | A1 | 4/2017 | Fasching |
| 2017/0155169 | A1 | 6/2017 | Hitz et al. |
| 2017/0162911 | A1 | 6/2017 | Gaben |
| 2017/0288232 | A1 | 10/2017 | Herle |
| 2018/0102571 | A1 | 4/2018 | Sakamoto |
| 2018/0219251 | A1 | 8/2018 | Rogren |
| 2019/0058217 | A1 | 2/2019 | Ahn |
| 2020/0028156 | A1 | 1/2020 | Zhang |
| 2020/0243870 | A1* | 7/2020 | Wachsman ........ H01M 10/0565 |
| 2020/0303779 | A1 | 9/2020 | Rogren |
| 2020/0358086 | A1 | 11/2020 | Hu et al. |

FOREIGN PATENT DOCUMENTS

| | | | |
|---|---|---|---|
| CN | 103313937 | A | 9/2013 |
| CN | 105636921 | A | 6/2016 |
| CN | 106165154 | A | 11/2016 |
| EP | 2099087 | | 9/2009 |
| EP | 3753034 | A1 | 12/2020 |
| JP | 60-001768 | | 1/1985 |
| JP | 11-283664 | | 10/1999 |
| JP | 2000100471 | | 4/2000 |
| JP | 2001-076533 | | 3/2001 |
| JP | 2004-063397 | A | 2/2004 |
| JP | 2006-032143 | | 2/2006 |
| JP | 2006-260887 | | 9/2006 |
| JP | 2008-226666 | | 9/2008 |
| JP | 2008-251225 | | 10/2008 |
| JP | 2009-054455 | A | 3/2009 |
| JP | 2009-181920 | A | 8/2009 |
| JP | 2009-259696 | A | 11/2009 |
| JP | 2010-015782 | A | 1/2010 |
| JP | 2010-108810 | | 5/2010 |
| JP | 2010-202499 | | 9/2010 |
| JP | 2010-218686 | | 9/2010 |
| JP | 2014-072009 | A | 4/2014 |
| JP | 2014-096350 | A | 5/2014 |
| WO | 2008059987 | | 5/2008 |
| WO | 2009108184 | | 9/2009 |
| WO | 2013140565 | A1 | 9/2013 |
| WO | 2013161310 | | 10/2013 |
| WO | 2014010043 | A1 | 1/2014 |
| WO | 2014/153534 | | 9/2014 |
| WO | 2014/153534 | A1 | 9/2014 |
| WO | 20160210371 | | 1/2016 |
| WO | 2016057426 | | 4/2016 |
| WO | 2016069749 | | 5/2016 |
| WO | 2016069749 | A1 | 5/2016 |
| WO | 2016069749 | A8 | 5/2016 |
| WO | 2016/094651 | A1 | 6/2016 |
| WO | 2017/116599 | | 7/2017 |
| WO | 2017190135 | A1 | 11/2017 |
| WO | 2018068034 | A1 | 4/2018 |
| WO | 2018184007 | A1 | 10/2018 |
| WO | 2018184010 | A1 | 10/2018 |
| WO | 2019/160993 | A1 | 8/2019 |
| WO | 2023097146 | A1 | 6/2023 |

OTHER PUBLICATIONS

Aguesse, F.; Manalastas, W.; Buannic, L.; Del Amo, J. M. L.; Singh, G.; Llordés, A.; Kilner, J. Investigating the Dendritic Growth during Full Cell Cycling of Garnet Electrolyte in Direct Contact with Li Metal. ACS Appl. Mater. Interfaces 2017, 9 (4), 3808-3816.

Akridge, et al., "Performance of Li/TiS2 solid state batteries using phosphorous chalcogenide network former glasses as solid electrolyte," Solid State Ionics, vols. 28-30, Part 1, Sep. 1988, pp. 841-846.
Braga, M. H.; Grundish, N. S.; Murchison, A. J.; Goodenough, J. B. Alternative Strategy for a Safe Rechargeable Battery. Energy Environ. Sci. 2017, 10 (1), 331-336.
Cheng, X. B. et al. Recent Advances in Energy Chemistry between Solid-State Electrolyte and Safe Lithium-Metal Anodes. Chem. 2019, 5 (1), 74-96.
Cheng, X.-B. et al., Toward Safe Lithium Metal Anode in Rechargeable Batteries: AReview. Chem. Rev. 2017, 117 (15), 10403-10473.
Choi, J. W. et al., Promise and Reality of Post-Lithium-Ion Batteries with High Energy Densities. Nat. Rev. Mater. 2016, 1 (4), 16013.
Deng, T.; Ji, X.; Zhao, Y.; Cao, L.; Li, S.; Hwang, S.; Luo, C.; Wang, P.; Jia, H.; Fan, X.; et al. Tuning the Anode-Electrolyte Interface Chemistry for Garnet-Based Solid-State Li Metal Batteries. Adv. Mater. 2020, 32 (23), 2000030.
Duan, H.; Chen, W. P.; Fan, M.; Wang, W. P.; Yu, L.; Tan, S. J.; Chen, X.; Zhang, Q.; Xin, S.; Wan, L. J.; et al. Building an Air Stable and Lithium Deposition Regulable Garnet Interface from Moderate-Temperature Conversion Chemistry. Angew. Chem., Int. Ed. 2020, 59 (29), 12069-12075.
Duan, H.; Fan, M.; Chen, W. P.; Li, J. Y.; Wang, P. F.; Wang, W. P.; Shi, J. L.; Yin, Y. X.; Wan, L. J.; Guo, Y. G. Extended Electrochemical Window of Solid Electrolytes via Heterogeneous Multilayered Structure for High-Voltage Lithium Metal Batteries. Adv. Mater. 2019, 31 (12), 1807789.
Duan, J.; Wu, W.; Nolan, A. M.; Wang, T.; Wen, J.; Hu, C.; Mo, Y.; Luo, W.; Huang, Y. Lithium-Graphite Paste: An Interface Compatible Anode for Solid-State Batteries. Adv. Mater. 2019, 31 (10), 1807243.
El kharbachi, et al. "Lithium ionic conduction in composites of Li(BH4)0 7510 25 and amorphous 0.75Li2 S0.25P2S5 for battery applications," Electrochimica Acta 278 (2018), pp. 332-339 wih Supplemental Information.
Fu ("Flexible, solid-state, ion-conducting membrane with 3D gamet nanofiber networks for lithium batteries") (Year: 2016).
Fu, K.; Gong, Y.; Xu, S.; Zhu, Y.; Li, Y.; Dai, J.; Wang, C.; Liu, B.; Pastel, G.; Xie, H.; et al. Stabilizing the Garnet Solid-Electrolyte/Polysulfide Interface in Li—S Batteries. Chem. Mater. 2017, 29 (19), 8037-8041.
Fu, Kun (Kelvin) et al., "Three-dimensional bilayer garnet solid electrolyte based high energy density lithium metal-sulfur batteries" Energy and Environmental Science, 2017.
Fu, Z.; Zhang, L.; Gritton, J. E.; Godbey, G.; Hamann, T.; Gong, Y.; McOwen, D.; Wachsman, E. Probing the Mechanical Properties of a Doped i7La3Zr2O12Garnet Thin Electrolyte for Solid-State Batteries. ACS Appl. Mater. Interfaces 2020, 12 (22), 24693-24700.
Hanc, et al., "On fabrication procedures of Li-ion conducting garnets," Journal of Solid State Chemistry 248, Jan. 2017, pp. 51-60.
Hanifi et al. Porous electrolyte-supported tubular micro-SOFC design, Solid State Ionics vol. 192, pp. 368-371, Aug. 16, 2010.
Hitz, et al., "High-rate lithium cycling in a scalable trilayer Li-garnet-electrolyte architecture," Materials Today, vol. 22, Jan./Feb. 2019 (28 pages).
Hua Xie, et al, "Amorphous-Carbon-Coated 3D Solid Electrolyte for an Electro-Chemomechanically Stable Lithium Metal Anode in Solid-State Batteries", Nano Lett. 2021, 21, pp. 6163-6170.
Huang, Y.; Chen, B.; Duan, J.; Yang, F.; Wang, T.; Wang, Z.; Yang, W.; Hu, C.; Luo, W.; Huang, Y. Graphitic Carbon Nitride (g-C3N4): An Interface Enabler for Solid-State Lithium Metal Batteries. Angew. Chem., Int. Ed. 2020, 59 (9), 3699-3704.
Huo, H.; Chen, Y.; Li, R.; Zhao, N.; Luo, J.; Pereira Da Silva, J. G.; Mucke, R.; Kaghazchi, P.; Guo, X.; Sun, X. Design of a Mixed Conductive Garnet/Li Interface for Dendrite-Free Solid Lithium Metal Batteries. Energy Environ. Sci. 2020, 13 (1), 127-134.
Kato, Y.; Hori, S.; Saito, T.; Suzuki, K.; Hirayama, M.; Mitsui, A.; Yonemura, M.; Iba, H.; Kanno, R. High-Power All-Solid-State Batteries Using Sulfide Superionic Conductors. Nat. Energy 2016, 1 (4), 16030.
Kazyak, E.; Garcia-Mendez, R.; LePage, W. S.; Sharafi, A.; Davis, A. L.; Sanchez, A. J.; Chen, K. H.; Haslam, C.; Sakamoto, J.; Dasgupta, N. P. Li Penetration in Ceramic Solid Electrolytes:

(56) References Cited

OTHER PUBLICATIONS

Operando Microscopy Analysis of Morphology, Propagation, and Reversibility. Matter 2020, 2 (4), 025-1048.

Krauskopf, T.; Dippel, R.; Hartmann, H.; Peppler, K.; Mogwitz, B.; Richter, F. H.; Zeier, W. G.; Janek, J. Lithium-Metal Growth Kinetics on LLZO Garnet-Type Solid Electrolytes. Joule 2019, 3 (8), 2030-2049.

Krauskopf, T.; Hartmann, H.; Zeier, W. G.; Janek, J. Toward a Fundamental Understanding of the Lithium Metal Anode in Solid-State Batteries—An Electrochemo-Mechanical Study on the Garnet-Type Solid Electrolyte Li 6.25 Al 0.25 La 3 Zr 2 O 12. ACS Appl. Mater. Interfaces 2019, 11 (15), 14463-14477.

Lin, D. et al., Reviving the Lithium Metal Anode for High-Energy Batteries. Nat. Nanotechnol. 2017, 12 (3), 194-206.

Liu, "Ionic Conductivity Enhancement of Polymer Electrolytes with Ceramic Nanowire Fillers" (Year: 2015).

Liu, Boyang et al., "3D lithium metal anodes hosted in asymmetric garnet frameworks toward high density batteries," Energy Storage Materials vol. 14, Sep. 2018, pp. 376-382, Available online Apr. 13, 2018.

Liu, et al., "Multilayer Composite Solid Electrolytes for Lithium Ion Batteries," Syracuse University, Dissertations—All, Surface, May 2016 (172 pages).

Luo, W.; Gong, Y.; Zhu, Y.; Fu, K. K.; Dai, J.; Lacey, S. D.; Wang, C.; Liu, B.; Han, X.; Mo, Y.; et al. Transition from Superlithiophobicity to Superlithiophilicity of Garnet Solid-State Electrolyte. J. Am. Chem. Soc. 2016, 138 (37), 12258-12262.

McOwen, D. W.; Xu, S.; Gong, Y.; Wen, Y.; Godbey, G. L.; Gritton, J. E.; Hamann, T. R.; Dai, J.; Hitz, G. T.; Hu, L.; et al. 3D-Printing Electrolytes for Solid-State Batteries. Adv. Mater. 2018, 30 (18), 1707132.

Murugan, R. Thangadurai, V. and Weppner., (2007), Fast Lithium Ion Conduction in Garnet-Type Li7La3Zr2O12. Angewandte Chemie, International Edition, 46: 7778-7781.

Osamu Yamamoto, "Solid oxide fuel cells; fundamental aspects and prospects," Electrochimica Acta 45 (2000), 2423-2435.

Pang, Q.; Shyamsunder, A.; Narayanan, B.; Kwok, C. Y.; Curtiss, L. A.; Nazar, L. F. Tuning the Electrolyte Network Structure to Invoke Quasi-Solid State Sulfur Conversion and Suppress Lithium Dendrite Formation in Li—S Batteries. Nat. Energy 2018, 3 (9), 783-791.

PCT International Search Report and Written Opinion from PCT/US2013/061660 dated Feb. 24, 2014.

PCT International Search Report and Written Opinion from PCT/US2014/031492 dated Aug. 11, 2014.

PCT International Search Report and Written Opinion from PCT/US2016/064232 dated Aug. 11, 2017.

PCT International Search Report and Written Opinion from PCT/US2017/030407 dated Jul. 7, 2017.

PCT International Search Report and Written Opinion from PCT/US2018/025289 dated Jul. 26, 2018.

Pfenninger, R.; Struzik, M.; Garbayo, I.; Stilp, E.; Rupp, J. L. M. A Low Ride on Processing Temperature for Fast Lithium Conduction in Garnet Solid-State Battery Films. Nat. Energy 2019, 4 (6), 475-483.

Presentation MIEC.

Sanghoon, Ji et al., "Fabrication of low-temperature solid oxide fuel cells with a nanothin protective layer by atomic layer deposition", Nanoscale Research Letter, vol. 8, Issue 48, pp. 1-7 Jan. 23, 2013.

Schnell, et al., "All-solid-state lithium-ion and lithium metal batteries—paving the way to large-scale production," Journal of Power Sources, vol. 382 (2018), pp. 160-175.

Shin, et al., "Comparative Study of TiS2/Li—In All-Solid-State Lithium Batteries Using Glass-Ceramic Li3PS4 and LiIoGeP2S12 Solid Electrolytes," Electrochimica Acta, vol. 146 (2014), pp. 395-402.

Tatsumisago, et al., "Recent development of sulfide solid electrolytes and interfacial modification for all-solid-state rechargeable lithium batteries," Journal of Asian Ceramic Societies 1 (2013), pp. 17-25.

Thangadurai, V.; Narayanan, S.; Pinzaru, D. Garnet-Type Solid-State Fast Li Ion Conductors for Li Batteries: Critical Review. Chem. Soc. Rev. 2014, 43 (13), 4714-4727.

Unemoto, et al., "Stable Interface Formation between TiS2 and LiBI-14 in Bulk-Type All-Solid-State Lithium Batteries," Chemistry of Materials, 2015, 27, pp. 5407-5416.

Wang, C.; Fu, K.; Kammampata, S. P.; McOwen, D. W.; Samson, A. J.; Zhang, L.; Hitz, G. T.; Nolan, A. M.; Wachsman, E. D.; Mo, Y.; et al. Garnet-Type Solid-State Electrolytes: Materials, Interfaces, and Batteries. Chem. Rev. 2020, 120 (10), 4257-4300.

International Search Report in the international application No. PCT/US2019/018349, dated May 2, 2019.

Written Opinion of the International Searching Authority in the international application No. PCT/US2019/018349, dated May 2, 2019.

Wang, C.; Xie, H.; Zhang, L.; Gong, Y.; Pastel, G.; Dai, J.; Liu, B.; Wachsman, E. D.; Hu, L. Universal Soldering of Lithium and Sodium Alloys on Various Substrates for Batteries. Adv. Energy Mater. 2018, 8 (6), 1701963.

Wang, et al., "Mixed ionic-electronic conductor enabled effective cathode-electrolyte interface in all solid state batteries," Nano Energy 50 (2018), pp. 393-400.

Wang, L.; Zhou, Z.; Yan, X.; Hou, F.; Wen, L.; Luo, W.; Liang, J.; Dou, S. X. Engineering of Lithium-Metal Anodes towards a Safe and Stable Battery. Energy Storage Mater. 2018, 14, 22-48.

West, et al., "Solid-State Sodium Batteries," Chapter 8, 1994, pp. 323-345.

Wood, K. N. et al., Lithium Metal Anodes: Toward an Improved Understanding of Coupled Morphological, Electrochemical, and Mechanical Behavior. ACS Energy Lett. 2017, 2 (3), 664-672.

Xu, AS. Et al., "Three-Dimensional, Solid-State Mixed Electron-Ion Conductive Framework for Lithium Metal Anode" Nano Letters 2018, 18, 6, 3926-3933, May 22, 2018.

Xu, W.; et al. Lithium Metal Anodes for Rechargeable Batteries. Energy Environ. Sci. 2014, 7 (2), 513-537.

Yang, C, et al., "Continuous plating/stripping behavior of solid-state lithium metal anode in a 3D ion-conductive framework," PNAS, Apr. 10, 2018, vol. 115, No. 15, pp. 3770-3775.

Yao, et al, "All-solid-state lithium batteries with inorganic solid electrolytes: Review of fundamental science," Chin. Phys. B, vol. 25, No. 1 (2016) 018802 (14 pages).

Zhang, Y. et al. Towards Better Li Metal Anodes: Challenges and Strategies. Mater. Today 2020, 33, 56-74.

Zhang, Y.; Meng, J.; Chen, K.; Wu, H.; Hu, J.; Li, C. Garnet-Based Solid-State Lithium Fluoride Conversion Batteries Benefiting from Eutectic Interlayer of Superior Wettability. ACS Energy Lett. 2020, 5 (4), 1167-1176.

Zhao, L., et al., "Disodium Terephthalate (Na2C8H4O4) as High Performance Anode Material for Low-Cost Room Temperature Sodium-Ion Battery" in Advanced Energy Materials, 2012, vol. 2, Issue 8, p. 962-965, published Aug. 2012. PDF file.

Zhao, N.; Khokhar, W.; Bi, Z.; Shi, C.; Guo, X.; Fan, L. Z.; Nan, C. W. Solid Garnet Batteries. Joule 2019, 3 (5), 1190-1199.

Zhao, Q.; Stalin, S.; Zhao, C. Z.; Archer, L. A. Designing Solid-State Electrolytes for Safe, Energy-Dense Batteries. Nat. Rev. Mater. 2020, 5 (3), 229-252.

Applicant's reply to EPO communication from the Examining Division dated Jan. 3, 2018 for EP Patent No. 2976798.

Applicant's reply to EPO dated Jan. 2, 2018 for EP Patent No. 2976798.

Curriculum vitae for Dr Bahareh Yazdani.

Curriculum vitae for Dr Christopher Lee.

Curriculum vitae for Dr Thomas Smith.

Extended European Search Report from EPO Patent Application No. 15855215.8 dated Apr. 23, 2018.

Extended European Search Report from European Patent Application No. 17867142.6 dated May 12, 2020.

Extended Search Report and Opinion from EPO Patent Application No. 14770567.7 dated Sep. 26, 2016.

Extract from Sigma Aldrich website, (https://www.sigmaaldrich.com/catalog/product/sial/s4126?lang=cn&region=GB), downloaded Aug. 5, 2019.

(56) References Cited

OTHER PUBLICATIONS

From U.S. Appl. No. 14/222,306 (now U.S. Pat. No. 10,622,666), Notice of Allowance dated Dec. 2, 2019.
From U.S. Appl. No. 14/222,306 (now U.S. Pat. No. 10,622,666), Office Action dated Apr. 25, 2016.
From U.S. Appl. No. 14/222,306 (now U.S. Pat. No. 10,622,666), Office Action dated Dec. 31, 2018.
From U.S. Appl. No. 14/222,306 (now U.S. Pat. No. 10,622,666), Office Action dated Feb. 14, 2018.
From U.S. Appl. No. 14/222,306 (now U.S. Pat. No. 10,622,666), Office Action dated Feb. 9, 2017.
From U.S. Appl. No. 15/522,459 (now U.S. Pat. No. 10,971,761), Notice of Allowance dated Mar. 2, 2021.
From U.S. Appl. No. 15/522,459 (now U.S. Pat. No. 10,971,761), Notice of Allowance dated Oct. 30, 2020.
From U.S. Appl. No. 15/522,459 (now U.S. Pat. No. 10,971,761), Office Action dated Aug. 23, 2019.
From U.S. Appl. No. 15/522,459 (now U.S. Pat. No. 10,971,761), Office Action dated Dec. 6, 2019.
From U.S. Appl. No. 15/522,459 (now U.S. Pat. No. 10,971,761), Office Action dated Mar. 18, 2019.
From U.S. Appl. No. 15/522,459 (now U.S. Pat. No. 10,971,761), Office Action dated Mar. 2, 2021.
From U.S. Appl. No. 15/522,459 (now U.S. Pat. No. 10,971,761), Office Action dated May 21, 2020.
From U.S. Appl. No. 15/522,459 (now U.S. Pat. No. 10,971,761), Office Action dated Sep. 4, 2020.
From U.S. Appl. No. 16/847,582, Office Action dated Sep. 21, 2021.
Hotza, et al., "Tape casting of preceramic polymers toward advanced ceramics: A review," International Journal of Ceramic Engineering and Science, 2019, 1:21-41.
Ji et al., Fabrication of low-temperature solid oxide fuel cells with a nonthin protective layer by atomic layer deposition, Nanoscale Research Letters, vol. 8, No. 48, pp. 1-7, Jan. 23, 2013.
Jonson, et al., "Tape casting and sintering of Li7La3Zr1.75 0.25A10.1012 with Li3BO3 additions," Solid State Ionics, vol. 323, Oct. 1, 2018, pp. 49-55.
Mistler, Richard et al., "Tape Casting Theory and Practice" 735 Ceramic Place, Westerville, OH 43081, USA : The American Ceramic Society, 2000, Chapter 2.
Mistler, Richard et al., "Tape Casting Theory and Practice" 735 Ceramic Place, Westerville, OH 43081, USA : The American Ceramic Society, 2000, Chapter 3.
Mistler, Richard et al., "Tape Casting Theory and Practice" 735 Ceramic Place, Westerville, OH 43081, USA : The American Ceramic Society, 2000, pp. 152 to 185.
Mistler, Richard et al., "Tape Casting Theory and Practice" 735 Ceramic Place, Westerville, OH 43081, USA : The American Ceramic Society, 2000, pp. 204 to 208.
Mistler, Richard et al., "Tape Casting Theory and Practice" 735 Ceramic Place, Westerville, OH 43081, USA : The American Ceramic Society, 2000, Title and Contents Pages.
Office action from Korean Patent Application No. 10-2015-7030408 dated Apr. 9, 2020 with its English translation.
Opponent's reply to EPO dated Jun. 17, 2020 for EP Patent No. 2976798.
PCT International Preliminary Report on Patentability (Chapter 1) with Written Opinion from PCT/US2015/057824 dated May 2, 2017.
PCT International Preliminary Report on Patentability (Chapter 1) with Written Opinion from PCT/US2017/060421.
PCT International Preliminary Report on Patentability (Chapter I) with Written Opinion from international application No. PCT/US2018/025289.
PCT International Preliminary Report on Patentability (Chapter I) with Written Opinion from PCT/US2013/061660 dated Feb. 24, 2014.
PCT International Preliminary Report on Patentability (Chapter I) with Written Opinion from PCT/US2014/031492 dated Sep. 22, 2015.
PCT International Preliminary Report on Patentability (Chapter I) with Written Opinion from PCT/US2016/064232.
PCT International Preliminary Report on Patentability (Chapter I) with Written Opinion from PCT/US2017/030407 dated Jul. 7, 2017.
PCT International Preliminary Report on Patentability (Chapter I) with Written Opinion from PCT/US2019/018349.
PCT International Search Report and Written Opinion from PCT/US2015/057824 dated Jan. 19, 2016.
PCT International Search Report and Written Opinion from PCT/US2017/060421 dated Jan. 17, 2018.
PCT International Search Report and Written Opinion from PCT/US2022/079575 dated Mar. 22, 2023.
R9—Crucible Selection; Oxford Vacuum Scientific, www.oxford-vacuum.com, Internet Archive capture of May 29, 2012.
Extended European Search Report from European Patent No. 19754082.6 dated Oct. 20, 2021.
Fu, et al., "Three-dimensional bilayer garnet solid electrolyte based high energy density lithium metal-sulfur batteries", Energy & Environmental Science, vol. 10, No. 7, Jan. 1, 2017, pp. 1568-1575, XP055749102, Cambridge, ISSN: 1754-5692, DOI: 10.1039/C7EE01004D.
McOwen, et al., "3D Printing Microstructured Li-Garnet Electrolytes for Solid State Batteries", ECS Meeting Abstracts, vol. MA2016-02, 102—Solid State Ionic Devices 11, vol. MA2016-02, Jan. 1, 2016, p. 2996, XP055849269.
McOwen, et al., "Understanding the Effect of Solid Electrolyte Structure on Properties through 3D Printing", ECS Meeting Abstracts, vol. MA2017-02, A06—Advanced Manufacturing Methods for Energy Storage Devices, vol. MA2017-02, Jan. 1, 2017, p. 586, XP055849276.
Ren, et al., "Garnet-type oxide electrolyte with novel porous-dense bilayer configuration for rechargeable all-solid-state lithium batteries", Ionics, Kiel, DE, vol. 23, No. 9, Jul. 15, 2017, pp. 2521-2527, XP036295599, ISSN: 0947-7047, DOI: 10.1007/ S11581-017-2224-5 [Reported by EPO as retrieved on Jul. 15, 2017].
Sun, et al., "3D Printing of Interdigitated Li-Ion Microbattery Architectures", Internet Citation, Jun. 17, 2013, pp. 4539-4543, XP002765684, Retrieved from the Internet:URL:http://onlinelibrary.wiley.com/doi/10.1002/adma.201301036/pdf [retrieved on Jan. 9, 2017].
Office action from Chinese Patent Application No. 201980021266.5 dated Jan. 24, 2022 with search report, and its English translation.

\* cited by examiner a b

As printed column array

Sintered column array

ORDERED POROUS SOLID ELECTROLYTE STRUCTURES, ELECTROCHEMICAL DEVICES WITH SAME, METHODS OF MAKING SAME

CROSS REFERENCE TO RELATED APPLICATIONS

This application is the U.S. national phase application of International Application No. PCT/US2019/018349 filed Feb. 15, 2019 which claims priority to U.S. Provisional Application No. 62/631,324, filed on Feb. 15, 2018, the disclosures of which are hereby incorporated by reference in their entireties.

STATEMENT REGARDING FEDERALLY SPONSORED RESEARCH

This invention was made with government support under NNC16CA03C awarded by NASA Glenn Research Center and DE-EE0008201 awarded by the Department of Energy. The government has certain rights in the invention.

FIELD OF THE DISCLOSURE

The disclosure generally relates to ordered solid state electrolyte structures. More particularly the disclosure generally relates to methods of making the ordered solid state electrolyte structures and uses of the ordered solid state electrolyte structures in electrochemical devices.

BACKGROUND OF THE DISCLOSURE

Solid state lithium conductors such as garnet-type $Li_7La_3Zr_2O_{12}$ (LLZ) have generated an enormous amount of interest as electrolytes for solid-state lithium batteries due to advantages these materials possess that could revolutionize battery technology. They are generally safer nonflammable materials, unlike the volatile carbonate solvents and reactive lithium salts used in conventional Li-ion battery electrolytes that are considered to be the main reason these batteries can catch fire. Further, many of the garnet-type lithium conductors have high electrochemical stability. LLZ in particular is stable to lithium metal, the battery anode of choice-lithium metal has the highest specific capacity and the most negative redox potential of any electrode. However, lithium metal cannot be used in conventional Li-ion batteries with liquid electrolytes due to Li dendrite propagation, which short-circuits the cell leading to catastrophic failure. Without Li metal, batteries are limited in the energy density that can be achieved.

A main obstacle hindering the commercialization of LLZ and similar solid electrolytes in solid state batteries is high cell area specific resistance (ASR), with contributions both from impedance of the thick electrolyte and interfacial impedance caused by poor electrode-electrolyte contact. The high impedance of the electrolyte is itself caused by two factors: relatively low conductivity and long diffusion distance.

Poor electrode-electrolyte contact exacerbates the issue. While liquid electrolytes can wet and conform to the electrode surface, solid electrolytes cannot, which drastically limits the total areal interface between the electrode and the electrolyte. Furthermore, garnet and other ceramic electrolytes are typically studied in flat, planar form—that is, the electrolyte powders are pressed into pellets and sintered to achieve uniform high density which provides strength and high conductivity. However, the planar geometry of the pellets means that any interface with the electrodes is limited to only the geometric contact area. This factor in conjunction with the difficulty in achieving uniform solid-solid contact between the electrolyte and the electrodes contributes to the high interfacial impedance solid electrolytes are known for. Each of these factors contributes to a high resistance cell and severely limits the achievable current density in a battery which is not be able to compete with standard liquid electrolyte Li-ion technology.

Although 3-D printing technology is distinguished for its capability to rapidly explore different structure-property relationships at a wide range of length scales. However, there are no reports of 3-D printing of a solid electrolyte.

SUMMARY OF THE DISCLOSURE

The present disclosure provides solid state electrolyte structures comprising an ordered porous microstructure and uses thereof. The solid-state electrolyte structures may be used as solid-state electrolytes. The present disclosure also provides methods of making and compositions for making solid state electrolytes comprising an ordered porous microstructure.

In an aspect, the present disclosure provides ordered porous solid state electrolyte structures. The ordered porous solid state electrolyte structures may be made using one or more 3-D printable composition of the present disclosure and/or by a method of 3-D printing of the present disclosure. The solid-state electrolyte structure conducts ions (e.g., lithium ions, sodium ions, or magnesium ions), for example, between an anode and a cathode. The solid-state electrolyte structure has a dense region (e.g., a dense layer), which may be a substrate, that is supported by one or more ordered porous microstructures (e.g., ordered porous layer(s)). The ordered porous microstructure of the solid-state electrolyte structure has an ordered porous structure. The ordered porous structure is formed by one or more features of the solid-state electrolyte structure. A solid-state electrolyte structure may have a cathode material and/or an anode material disposed on at least a portion of the ordered microstructure(s) of the solid-state electrolyte structure.

In an aspect, the present disclosure provides composition for 3-D printing ordered porous solid state electrolyte structures. The compositions may be used (e.g., in a method of the present disclosure) to make a solid-state electrolyte of the present disclosure. A 3-D printable composition comprises an ion-conducting material (e.g., an ion-conducting polymeric material, such as for example, an ion-conducting polymer, an ion-conducting inorganic material, such as for example, an ion-conducting inorganic powder, or an ion-conducting hybrid polymer/inorganic material), or a combination of precursor materials (e.g., powders) (such as, for example, metal oxides, carbonates, nitrates, and the like) that when heated form an ion-conducting inorganic material (e.g., an ion-conducting ceramic material); and at least one of a dispersant, a binder, a plasticizer, or a solvent (e.g., one or more dispersant, one or more binder, one or more plasticizer, or one more solvent, or any combination of one or more thereof or any combination thereof).

In an aspect, the present disclosure provides methods of 3-D printing ordered porous solid state electrolyte structures. The methods may use one or more composition of the present disclosure and/or be used to make an ordered porous solid state electrolyte structure of the present disclosure. The method can use the same or different compositions to form one or more layers of ordered solid state electrolyte precursor material disposed on the dense layer. The methods may include deposition of the same features or combinations of precursor material features having at least one different shape. This precursor material may be allowed to dry (e.g., in between individual feature and/or layers or after all of the features and/or layers of precursor materials are deposited). After deposition is complete, the ordered solid state electrolyte precursor material is heated (e.g., sintered) to provide a solid-state electrolyte structure. The method may be carried out on a 3-D printer. Non-limiting examples of methods of making an ordered porous solid state electrolyte are provided herein.

In an aspect, the present disclosure provides electrochemical devices. The devices comprise one or more solid-state electrolyte structure of the present disclosure. Non-limiting examples of devices include batteries, electrolysis cells, capacitors, fuel cells, or fuel cell/battery devices. The devices may be lithium-ion-conducting devices, sodium-ion-conducting devices, or magnesium-ion-conducting devices.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
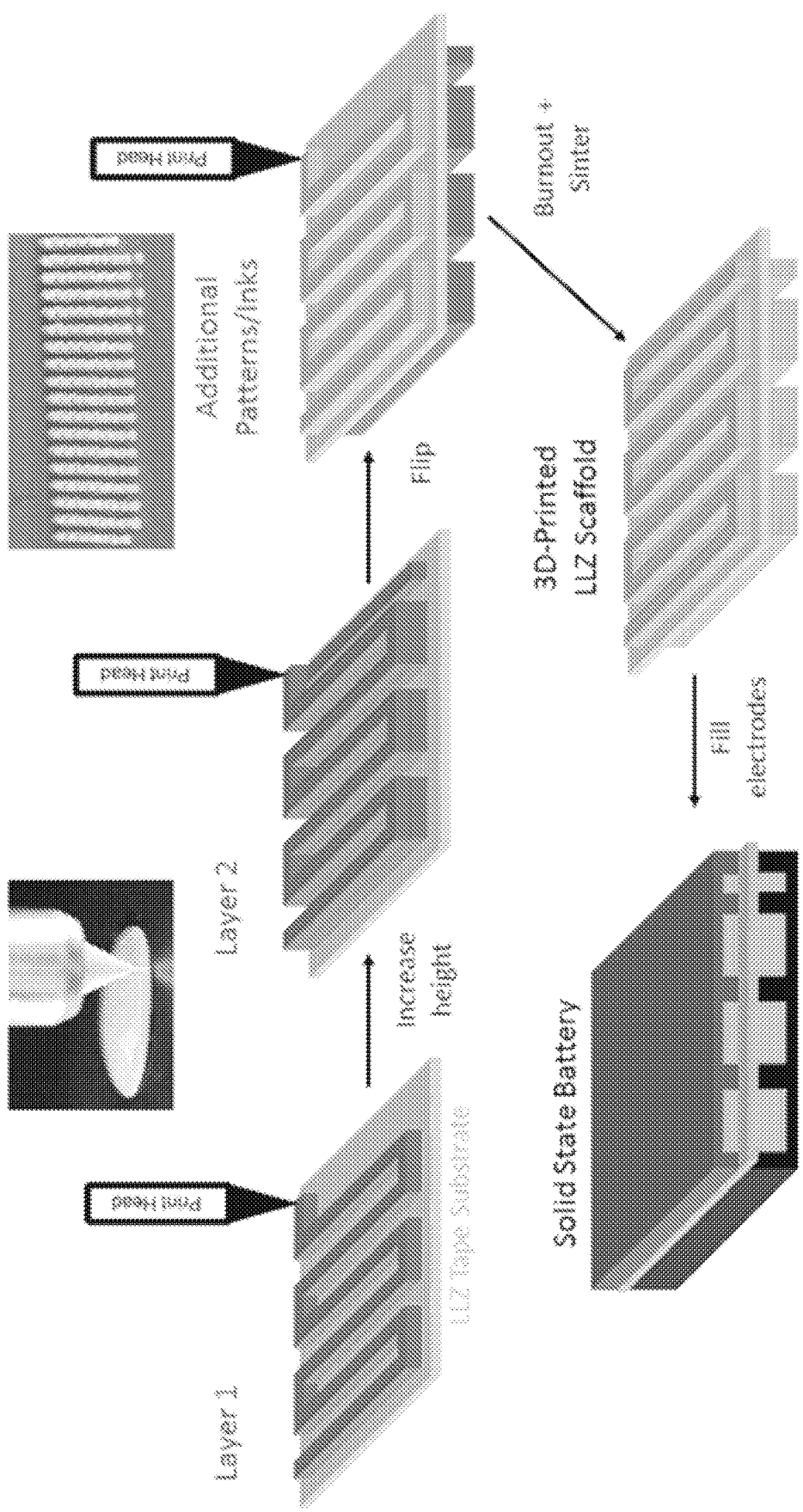
FIG. 1 shows a schematic of the process to 3-D print solid electrolyte structures. In this case, the ink is printed on a LLZ substrate, which can be a 3-D printed LLZ film using the conformal ink, or an LLZ tape. The structure height is increased by adding layers, and different designs can be printed on either side of the substrate. Once dry, the 3-D printed LLZ inks and substrate are placed in a furnace for binder burnout and sintering, and are then ready for electrode infiltration to complete battery assembly

Although claimed subject matter will be described in terms of certain embodiments and examples, other embodiments and examples, including embodiments and examples that do not provide all of the benefits and features set forth herein, are also within the scope of this disclosure. Various structural, logical, process step, and electronic changes may be made without departing from the scope of the disclosure.

Ranges of values are disclosed herein. The ranges set out examples of a lower limit value and an upper limit value. Unless otherwise stated, the ranges include all values to the magnitude of the smallest value (either lower limit value or upper limit value) and ranges between the values of the stated range.

The present disclosure provides solid state electrolyte structures comprising an ordered porous microstructure and uses thereof. The solid-state electrolyte structures may be used as solid-state electrolytes. The present disclosure also provides methods of making and compositions for making solid state electrolytes comprising an ordered porous microstructure.

In an aspect, the present disclosure provides ordered porous solid state electrolyte structures. The ordered porous solid state electrolyte structures may be made using one or more 3-D printable composition of the present disclosure and/or by a method of 3-D printing of the present disclosure.

The solid-state electrolyte structure conducts ions (e.g., lithium ions, sodium ions, magnesium ions, or the like), for example, between an anode and a cathode. The solid-state electrolyte structure has a dense region (e.g., a dense layer), which may be a substrate, that is supported by one or more ordered porous microstructures (e.g., ordered porous layer(s)). An ordered porous microstructure may comprise the same ion-conducting material or, independently, a different ion-conducting material.

The ordered porous microstructure of the solid-state electrolyte structure has an ordered porous structure. The ordered porous structure is formed by one or more features of the solid-state electrolyte structure. Where ordered porous microstructures are present the pore structure of the two microstructures may be the same or different. The pore structure of the individual microstructures may be selected to, for example, accommodate processing steps (e.g., certain pore structures may be easier to fill with electrode material (e.g., charge storage material) (e.g., cathode or anode materials)) in, for example, subsequent screen-printing or infiltration steps, and achieve a desired electrode material capacity, i.e., how much of the conducting material (e.g., $Li^+$, $Na^+$, $Mg^{2+}$) is stored in the electrode materials. The microstructure also extends ion conduction of the dense phase (solid electrolyte) into the electrode layer to reduce electrode resistance both in terms of ion conduction through electrode and interfacial resistance due to charge transfer reaction at electrode/electrolyte interface, the later improved by having more electrode/electrolyte interfacial area.

The solid-state, ion-conducting electrolyte material is configured such that ions (e.g., lithium ions, sodium ions, or magnesium ions) diffuse into and out of the porous region(s) (e.g., porous layer(s)) of the solid-state, ion-conducting electrolyte material during charging and/or discharging of the battery. In an embodiment, the solid-state, ion-conducting battery comprises a solid-state, ion-conducting electrolyte material comprising one or two porous regions (e.g., porous layer(s)) configured such that ions (e.g., lithium ions, sodium ions, or magnesium ions) diffuse into and out of the porous region(s) of solid-state, ion-conducting electrolyte material during charging and/or discharging of the battery.

A solid-state electrolyte structure comprises at least one ordered porous microstructure disposed on the surface of a dense layer of ion-conducting material, which may be referred to as a substrate. The structure may have two ordered porous microstructures disposed on opposite sides of a dense layer of ion-conducting material.

An ordered porous microstructure comprises pores. The pores may be referred to as voids. The pores are defined by features comprising an ion-conducting material. Non-limiting examples of features include columns, lines, grids, combinations thereof, and the like. The features may be formed by 3-D printing. The ordered porous microstructure may be a multilayer structure (e.g., 2 to 100 layers, including all integer number of layers and ranges therebetween). A multilayer structure may comprise columns, lines, grids, combinations thereof, and the like.

The pores may have various sizes. For example, an ordered porous microstructure comprises a plurality of pores having at least one dimension (e.g., a diameter), as measured in a plane parallel to the substrate (e.g., first surface) of 1 μm to 2000 μm (e.g., 1 to 1000 μm) and/or an ordered porous microstructure comprises a plurality of pores having a height (e.g., as measured perpendicular to the substrate (e.g., first surface) of 1 μm to 2000 μm (e.g., 1 to 1000 μm). The pores may have substantially the same (or the same) size or have one or more different sizes. By "substantially", it is meant that individual pore size differs by 5% or less or 1% or less.

The features may have various sizes. For example, an ordered porous microstructure comprises a plurality of features and has pores defined by at least one feature having at least one dimension (e.g., a diameter) of less than or equal to 300 μm. In various examples, an ordered porous microstructure comprises a plurality of features having pores defined by at least one feature having at least one dimension (e.g., a diameter) of 1 μm to 200 μm, and all values, including integer micron values, therebetween. The features may have substantially the same (or the same) size or have one or more different sizes.

The features may be disposed on various amounts of the dense layer (e.g., substrate) surface. For example, the features are disposed on 10 to 90%, including all integer % values and ranges therebetween, of an exterior surface of the dense layer. In other examples, the features are disposed on 15 to 50% or 20 to 40% of an exterior surface of the dense layer.

The ordered porous microstructure may have various thickness. Thickness may be referred to as the height of the microstructure. It is desirable to have a thick microstructure (e.g., a microstructure having a thickness of up to 2000 μm (e.g. up to 1000 μm)).

A dense layer may have various thickness. For example, the dense layer has a thickness less than or equal to 100 μm (e.g., 5 to 30 μm). A dense layer may be referred to a substrate.

The dense layer and ordered porous microstructure(s) can be formed from various ion-conducting materials (e.g., lithium-ion-conducting materials, sodium-ion-conducting materials, and magnesium ion-conducting materials). The ion-conducting materials may be ion-conducting inorganic (e.g., ceramic) materials, ion-conducting polymeric (e.g., ion-conducting polymer materials), or ion-conducting hybrid materials (e.g., comprising both ion-conducting inorganic (e.g., ceramic materials) and ion-conducting polymeric (e.g., polymer) materials. The dense layer and ordered porous microstructure(s) may be the same or different ion-conducting materials. An individual microstructure may have features of the same or different ion-conducting materials.

A dense layer may comprise an ion-conducting polymer material. Various ion-conducting polymer materials can be used. The polymer materials may comprise one or more ion-conducting polymer, one or more ion-conducting copolymer, or a combination thereof. Molecular weight of the polymer(s) and/or copolymer(s) is not particularly limited. For example, depending on the performance (e.g., ion conductivity) requirement of a devices (e.g., a solid-state, ion-conducting battery), polymer(s) and/or copolymer(s) can have a broad range of molecular weight. A polymeric material may comprise a mixture of conducting polymer(s) and/or copolymer(s) and non-conducting polymer(s) and/or copolymer(s). Examples of ion-conducting polymers are provided herein. Polymer(s) and/or copolymers can have various structure (e.g., secondary structure). In various examples, polymer(s) and/or copolymer(s) are amorphous, crystalline, or a combination thereof. It may be desirable that the polymer(s) and/or copolymers have low crystallinity.

A dense layer may comprise an inorganic material. The dense layer may be the same inorganic material as that of an ordered porous microstructure.

In an example, the dense layer is a garnet material. Non-limiting examples of garnet materials include lithium garnet materials, doped lithium garnet materials, lithium garnet composite materials, and combinations thereof. Non-limiting examples of lithium garnet materials include $Li_3$-phase lithium garnet SSE materials (e.g., $Li_3M^1Te_2O_{12}$, where $M^1$ is a lanthanide such as Y, Pr, Nd, Sm, Eu, Gd, Tb, Dy, Ho, Er, Tm, Yb, Lu, Zr, Ta, or a combination thereof and $Li_{3+x}Nd_3Te_{2-x}O_{12}$, where x is 0.05 to 1.5, $Li_5$-phase lithium garnet SSE materials (e.g., $Li_5La_3M^2{}_2O_{12}$, where $M^2$ is Nb, Zr, Ta, Sb, or a combination thereof, cation-substituted $Li_5La_3M^2{}_2O_{12}$ such as, for example, $Li_6M^1La_3M^2{}_2O_{12}$, where $M^1$ is Mg, Ca, Sr, Ba, or combinations thereof, and $Li_7La_3M^2{}_2O_{12}$, where $M^2$ is Zr, Sn, or a combination thereof); $Li_6$-phase lithium garnet SSE materials (e.g., $Li_6M^1La_2M^2{}_2O_{12}$, where $M^1$ is Mg, Ca, Sr, Ba, or a combination thereof and $M^2$ is Nb, Ta, or a combination thereof); cation-doped $Li_6La_2BaTa_2O_{12}$; cation-doped $Li_6BaY_2M^2{}_2O_{12}$, where $M^2$ is Nb, Ta, or a combination thereof and the cation dopants are barium, yttrium, zinc, or combinations thereof, an $Li_7$-phase lithium garnet SSE material (e.g., cubic $Li_7La_3Zr_2O_{12}$ and $Li_7Y_3Zr_2O_{12}$); cation-doped $Li_7La_3Zr_2O_{12}$; $Li_{5+2x}La_3$, $Ta_{2-x}O_2$, where x is 0.1 to 1, $Li_{6.8}(La_{2.95},Ca_{0.5})(Zr_{1.75},Nb_{0.25})O_{12}$ (LLCZN), $Li_{6.4}Y_3Zr_{1.4}Ta_{0.6}O_{12}$, $Li_{6.5}La_{2.5}Ba_{0.5}TaZrO_{12}$, $Li_6BaY_2M^1{}_2O_{12}$, $Li_7Y_3Zr_2O_{12}$, $Li_{6.75}BaLa_2Nb_{1.75}Zn_{0.25}O_{12}$, or $Li_{6.75}BaLa_2Ta_{1.75}Zn_{0.25}O_{12}$), lithium garnet composite materials (e.g., lithium garnet-conductive carbon matrix or composites with other materials). Other examples of lithium-ion-conducting SSE materials include cubic garnet-type materials such as 3 mol % YSZ-doped $Li_{7.6}La_3Zr_{1.94}Y_{0.06}O_{12}$ and 8 mol % YSZ-doped $Li_{7.16}La_3Zr_{1.94}Y_{0.06}O_{12}$. Additional examples of suitable Li-garnet SSE materials include, but are not limited to, $Li_5La_3Nb_2O_{12}$, $Li_5La_3Ta_2O_{12}$, $Li_7La_3Zr_2O_{12}$, $Li_6La_2SrNb_2O_{12}$, $Li_6La_2BaNb_2O_{12}$, $Li_6La_2SrTa_2O_{12}$, $Li_6La_2BaTa_2O_{12}$, $Li_7Y_3Zr_2O_{12}$, $Li_{6.4}Y_3Zr_{1.4}Ta_{0.6}O_{12}$, $Li_{6.5}La_{2.5}Ba_{0.5}TaZrO_{12}$, $Li_7Y_3Zr_2O_{12}$, $Li_{6.75}BaLa_2Nb_{1.75}Zn_{0.25}O_{12}$, or $Li_{6.75}BaLa_2Ta_{1.75}Zn_{0.25}O_{12}$.

The dense layer can be a sodium-ion-conducting material. For example, a dense layer material comprises $\beta''$-$Al_2O_3$, $Na_4Zr_2Si_2PO_{12}$ (NASICON), or cation-doped NASICON (e.g., $Na_4ZrAlSi_2PO_{12}$, $Na_4ZrFeSi_2PO_{12}$, $Na_3Zr_{1.94}Y_{0.06}Si_2PO_2$, $Na_4ZrSbSi_2PO_{12}$, or $Na_4ZrDySi_2PO_{12}$).

The dense layer can a magnesium-ion-conducting material. For example, a dense layer material comprises $Mg_{1+x}(Al,Ti)_2(PO_4)_6$, NASICON-type magnesium-ion-conducting materials (e.g., $Mg_{1-2x}(Zr_{1-x}M_x)_4P_6O_{24}$ or $Mg_{1-2x}(Zr_{1-x}M_x)(WO_4)_3$, where x is 0.01 to 0.5).

The ion-conducting material of the solid-state electrolyte structure may be a lithium-ion-conducting material, sodium-ion-conducting material, or magnesium-ion-conducting material. The ion-conducting material of the solid-state electrolyte structure may be an inorganic ion-conducting material, a polymeric ion-conducting material, or a combination thereof.

An ion-conducting material of an ordered porous microstructure may be an ion-conducting polymeric material. Various conducting polymeric materials can be used. The polymeric materials may comprise one or more ion-conducting polymer, one or more ion-conducting copolymer, or a combination thereof. Molecular weight of the polymer(s) and/or copolymer(s) is not particularly limited. For example, depending on the performance (e.g., ion conductivity) requirement of a devices (e.g., a solid-state, ion-conducting battery), polymer(s) and/or copolymer(s) can have a broad range of molecular weight. A polymeric material may comprise a mixture of conducting polymer(s) and/or copolymer(s) and non-conducting polymer(s) and/or copolymer(s). Examples of suitable conducting polymer are known in the art.

A polymeric material may comprise a conducting salt. Non-limiting examples of salts include lithium salts (e.g., LiTFSE, and the like), sodium salts, and magnesium salts and ionic liquids. Examples of suitable salts and ionic liquids are known in the art.

Polymer(s) and/or copolymers can have various structure (e.g., secondary structure). In various examples, polymer(s) and/or copolymer(s) are amorphous, crystalline, or a combination thereof. It may be desirable that the polymer(s) and/or copolymers have low crystallinity.

Non-limiting examples of ion-conducting polymeric materials includes materials comprising an ion-conducting polymer chosen from poly(ethylene) (PE), poly(ethylene oxide) (PEO), poly(propylene) (PP), poly(propylene oxide), PEO containing copolymers (e.g., polystyrene (PS)-PEO copolymers and poly(methyl methacrylate) (PMMA)-PEO copolymers), polyacrylonitrile (PAN), poly(acrylonitrile-co-methylacrylate), PVdF containing copolymers (e.g., polyvinylidene fluoride-co-hexafluoropropylene (PVdF-co-HFP)), PMMA copolymers (e.g., poly(methylmethacrylate-co-ethylacrylate)), and combinations thereof and, optionally, a conducting salt (e.g., an ionic liquid).

An ion-conducting material of an ordered porous microstructure may be a lithium-ion-conducting material, sodium-ion-conducting material, or magnesium-ion-conducting material. An ion-conducting material of an ordered porous microstructure may be a lithium-ion-conducting material, sodium-ion-conducting material, or magnesium-ion-conducting material. Examples of suitable lithium-ion-conducting materials, sodium-ion-conducting materials, and magnesium-ion-conducting materials are known in the art. The ion-conducting materials may have various structures and/or compositions. A lithium-ion-conducting material may be a ceramic material. A lithium-ion-conducting material may be a lithium-garnet material. Examples of ion-conducting materials are provided herein.

A solid-state electrolyte structure may have a cathode material and/or an anode material disposed on at least a portion of the ordered microstructure(s) of the solid-state electrolyte structure. Examples of cathode materials and anode materials are provided herein.

It may be desirable to use particular microstructures with certain cathode materials. Certain combinations of microstructure and cathode material may provide process advantages and/or improved device performance. For example, a microstructure is a cathode-side porous microstructure and the microstructure comprises a plurality of columnar structures and the cathode material is a lithium-containing material. In another example, the microstructure comprises a grid structure or multilayer grid structure and cathode material is sulfur.

A solid state electrolyte may comprise a random porous microstructure disposed on a portion of a substrate. Non-limiting examples of suitable random porous microstructures are described in International Application No. PCT/US14/31492, filed on Mar. 21, 2014, U.S. patent application Ser. No. 15/364,528, filed Nov. 30, 2016, the disclosures of which related to porous layers are incorporated herein by reference.

In an aspect, the present disclosure provides composition for 3-D printing ordered porous solid state electrolyte structures. The compositions may be used (e.g., in a method of the present disclosure) to make a solid-state electrolyte of the present disclosure.

This disclosure provides solid electrolyte compositions (which may be referred to herein as inks) that can be used for printing micron-scale features and can be tuned to create structures that range from being conformal to the surface of a substrate, creating for example, a 5-10 μm sintered solid electrolyte film, to self-supporting, resulting in structures such as, for example, a stacked-array, or "log-cabin" type structure. These inks can have a broad range of rheological properties which can be manipulated by modifying the composition of the ink for a particular purpose, e.g., a desired rheological and/or structural property. In an example, the solid electrolyte material is LLZ garnet.

A 3-D printable composition comprises an ion-conducting material (e.g., an ion-conducting polymeric material, such as for example, an ion-conducting polymer, an ion-conducting inorganic material, such as for example, an ion-conducting inorganic powder, or an ion-conducting hybrid polymer/inorganic material), or a combination of precursor materials (e.g., powders) (such as, for example, metal oxides, carbonates, nitrates, and the like) that when heated form an ion-conducting inorganic material (e.g., an ion-conducting ceramic material); and at least one of a dispersant, a binder, a plasticizer, or a solvent (e.g., one or more dispersant, one or more binder, one or more plasticizer, or one more solvent, or any combination of one or more thereof or any combination thereof). In various examples, the weight % of the ion-conducting material or combination of precursor materials and, if present, dispersant(s), binder(s), plasticizer(s), and solvent(s) equals 100%.

The ion-conducting material may be a lithium-ion-conducting material, sodium-ion-conducting material, or magnesium-ion-conducting material. The ion-conducting material may be an inorganic ion-conducting material, a polymeric ion-conducting material, or a combination thereof.

Various ion-conducting polymeric materials can be used. The ion-conducting polymeric materials may comprise one or more ion-conducting polymer, one or more ion-conducting copolymer, or a combination thereof. Molecular weight of the ion-conducting polymer(s) and/or ion-conducting copolymer(s) is not particularly limited. For example, depending on the performance (e.g., ion conductivity) requirement of a devices (e.g., a solid-state, ion-conducting battery), ion-conducting polymer(s) and/or ion-conducting copolymer(s) can have a broad range of molecular weight. Non-limiting examples of ion-conducting polymer(s) and/or ion-conducting copolymer(s) include poly(ethylene)s (PEs), poly(ethylene oxides) (PEOs), poly(propylene)s (PPs), poly(propylene oxide)s, PEO containing copolymers (e.g., polystyrene (PS)-PEO copolymers and poly(methyl methacrylate) (PMMA)-PEO copolymers), polyacrylonitrile (PAN), poly(acrylonitrile-co-methylacrylate), PVdF containing copolymers (e.g., polyvinylidene fluoride-co-hexafluoropropylene (PVdF-co-HFP)), PMMA copolymers (e.g., poly(methylmethacrylate-co-ethylacrylate)), and combinations thereof. The polymeric material may comprise a conducting salt (e.g., an ionic liquid).

The ion-conducting material may be an inorganic material. For example, the ion-conducting material is a lithium-ion-conducting inorganic material, sodium-ion-conducting inorganic material, or magnesium-ion-conducting inorganic material. The ion-conducting inorganic material may be in the form of particles. The inorganic material may be present in various amounts and sizes as described herein.

A composition can comprise one or more dispersant, one or more binder, one or more plasticizer, one or more solvent, or a combination thereof. An individual dispersant, binder, plasticizer, or solvent may also be considered a dispersant, binder, plasticizer, solvent, or a combination thereof. Various examples of dispersants, binders, plasticizers, and solvents are provided herein. The dispersant(s), binder(s), plasticizer(s), or solvent(s) may be present in various amounts as described herein. A composition may have one or more component that serves as a dispersant, a binder, a plasticizer, a solvent, or a combination thereof.

It is desirable that a composition have one or more properties that render that composition 3-D printable. For example, a composition has a viscosity of 100 to 1,000,000 cP (e.g., 500 to 50,000 cP), including all integer cP values and ranges therebetween, and/or the yield stress is greater than 0 Pa or equal to 0 Pa.

In an aspect, the present disclosure provides methods of 3-D printing ordered porous solid state electrolyte structures. The methods may use one or more composition of the present disclosure and/or be used to make an ordered porous solid state electrolyte structure of the present disclosure.

The method can use the same or different compositions to form one or more layers of ordered solid state electrolyte precursor material disposed on the dense layer. The methods may include deposition (e.g., in a single layer or multiple layers) of the same features or combinations of precursor material features having at least one different shape. This precursor material may be allowed to dry (e.g., in between individual feature and/or layers or after all of the features and/or layers of precursor materials are deposited). After deposition is complete, the ordered solid state electrolyte precursor material is heated (e.g., sintered) to provide a solid-state electrolyte structure. The method may be carried out on a 3-D printer. Non-limiting examples of methods of making an ordered porous solid state electrolyte are provided herein.

In an aspect, the present disclosure provides electrochemical devices. The devices comprise one or more solid-state electrolyte structure of the present disclosure.

Various electrochemical devices can comprise one or more solid-state electrolyte structure of the present disclosure. Non-limiting examples of devices include batteries, electrolysis cells, capacitors, fuel cells, or fuel cell/battery devices. The devices may be lithium-ion-conducting devices, sodium-ion-conducting devices, or magnesium-ion-conducting devices.

The batteries may be solid-state batteries, which may be rechargeable batteries. The solid-state batteries (e.g., lithium-ion solid state electrolyte batteries, sodium-ion solid state electrolyte batteries, or magnesium-ion solid state electrolyte batteries) may comprise various additional structural components (such as bipolar plates, external packaging, and electrical contacts/leads to connect wires. In an embodiment, the battery further comprises bipolar plates. In an embodiment, the battery further comprises bipolar plates and external packaging, and electrical contacts/leads to connect wires. In an embodiment, repeat battery cell units are separated by a bipolar plate.

The cathode material (if present), the anode material (if present), the SSE material, the cathode-side (first) current collector (if present), and the anode-side (second) current collector (if present) may form a cell. In this case, the solid-state, ion-conducting battery comprises a plurality of cells separated by one or more bipolar plates. The number of cells in the battery is determined by the performance requirements (e.g., voltage output) of the battery and is limited only by fabrication constraints. For example, the solid-state, ion-conducting battery comprises 1 to 500 cells, including all integer number of cells and ranges therebetween.

In an example, a solid-state, ion-conducting battery comprises: a) a cathode material; b) an anode comprising a metal-alloy layer of the present disclosure; c) solid-state electrolyte material; and d) optionally, a current collector disposed on at least a portion of the cathode material or the lithium-metal anode.

A solid-state battery can comprise various cathode materials. Examples of cathode materials include, but are not limited to, known cathode materials used in ion-conducting (e.g., lithium, sodium, or magnesium ion-conducting) batteries. The cathode materials may be specific to the metal-alloy layer.

Examples of cathode materials include, but are not limited to, conducting carbon materials, sulfur (S), oxygen ($O_2$), organic sulfide or polysulfide (e.g., carbynepolysulfide and copolymerized sulfur), and the like. A conducting carbon material, optionally, further comprises an organic or gel ion-conducting electrolyte.

The cathode material can be an air electrode. Examples of materials suitable for air electrodes include those used in solid-state lithium-ion batteries with air cathodes such as large surface area carbon particles (e.g., Super P which is a conductive carbon black) and catalyst particles (e.g., alpha-$MnO_2$ nanorods) bound in a mesh (e.g., a polymer binder such as PVDF binder).

In the case of lithium-ion-conducting batteries, the cathode material can be a lithium-containing material. For example, the lithium-ion-conducting cathode material is lithium nickel manganese cobalt oxides (NMC, $LiNi_xMn_y\text{-}Co_zO_2$, where $x+y+z=1$), $LiNi_{1/3}Co_{1/3}Mn_{1/3}O_2$, $LiNi_{0.5}Co_{0.2}Mn_{0.3}O_2$, lithium manganese oxides (LMOs), such as $LiMn_2O_4$, $LiNi_{0.5}Mn_{1.5}O_4$, lithium iron phosphates (LFPs) such as $LiFePO_4$, $LiMnPO_4$, and $LiCoPO_4$, and $Li_2MMn_3O$, where M is selected from Fe, Co, and combinations thereof. The ion-conducting cathode material can be a high energy ion-conducting cathode material such as $Li_2MMn_3O_8$, wherein M is selected from Fe, Co, and combinations thereof. In an example, the lithium-ion-conducting cathode material is $LiCoO_2$.

In the case of sodium ion-conducting batteries, the cathode material can be a sodium-containing material. Examples of sodium-containing materials, include, but are not limited to, $Na_xMO_2$ materials (x=0.17-0.67, M=Mn, Ni, Co or a combination thereof) (e.g., $Na_xMnO_2$, $Na_x[Ni_yMn_{1-y}]O_2$, y=0-1), $Na_xCoO_2$, $Na_x[Ni_{1/3}Co_{1/3}Mn_{1/3}]O_2$), $NaMPO_4$ (M=Fe, Mn) materials, $Na_2Fe_2(SO_4)_3$ materials, $Na_3V_2(PO_4)_3$ materials, and the like.

In the case of magnesium-ion-conducting batteries, the cathode materials can be magnesium-containing materials, $FeS_2$ materials, $MoS_2$ materials, $TiS_2$ materials, and the like. Examples of magnesium-containing materials include, but are not limited to, $MgMSiO_4$ (M=Fe, Mn, Co) materials and $MgFePO_4F$ materials, and the like.

It may be desirable to use an electronically conductive material as part of an ion-conducting cathode material. For example, an ion-conducting cathode material also comprises an electrically conducting carbon material (e.g., graphene or carbon black), and the ion-conducting cathode material, optionally, further comprises an organic or gel ion-conducting electrolyte. The electronically conductive material may separate from the ion-conducting cathode material. For example, electronically conductive material (e.g., graphene) is disposed on at least a portion of a surface (e.g., a pore surface) of the porous region of an SSE electrolyte structure and the ion-conducting cathode material is disposed on at least a portion of the electrically conductive material (e.g., graphene).

Various current collectors can be used. Examples of current collectors include, but are not limited to, conducting metals or conducting metal alloys. Suitable current collectors are known in the art.

A cathode material, the anode, the SSE material, and current collector can form a cell. In an example, a solid-state battery comprises a plurality of cells, each adjacent pair of the cells is separated by a bipolar plate.

Various articles of manufacture can comprise one or more device of the present disclosure. Non-limiting examples of articles of manufacture include, but are not limited to, consumer products such as, for example, digital cameras, personal digital assistants (PDAs), cellphones (e.g., smartphones), watches, power tools, thermometers, remote car locks, laser pointers, MP3 players, hearing aids, calculators, toys (e.g., remote control toys), power supplies (e.g., backup systems such as emergency power backups, uninterruptible power supply, and power storage for alternative energy sources such as wind and photovoltaic power generation systems), surveillance or alarm systems, medical devices/equipment, mobility equipment (e.g., electric wheelchairs and stair lifts), portable power packs, transportation devices (e.g., electric vehicles such as cars, buses, and motorcycles), charging stations, and the like.

The steps of the method described in the various embodiments and examples disclosed herein are sufficient to carry out the methods of the present disclosure. Thus, in an example, a method consists essentially of a combination of the steps of the methods disclosed herein. In another example, a method consists of such steps.

The following Statements provide non-limiting examples of solid-state electrolyte structures, electrochemical devices, methods of making solid-state electrolyte structures, and 3-D printable compositions of the present disclosure:

Statement 1. A solid-state electrolyte structure, comprising: a substrate described herein made from a first ion-conducting material described herein and having a first surface; and a first ordered porous microstructure described herein disposed on the first surface of the substrate, the first ordered porous microstructure having pores defined by at least one feature, the at least one feature having at least one dimension (e.g., a diameter) of less than 300 µm (e.g., 1 µm to 300 µm), and the feature being made from a second ion-conducting material described herein. The features may be disposed on 10 to 90%, 15 to 50% or 20 to 40% of an exterior surface of the dense layer. The plurality of features may form a multilayer structure.

Statement 2. A solid-state electrolyte structure according to Statement 1, where the first ordered porous microstructure has a height of less than or equal to 2000 µm (e.g., less than or equal to 1000 µm) (e.g., 1 to 2000 µm or 1 to 1000 µm).

Statement 3. A solid-state electrolyte structure according to Statement 1 or 2, where the pores each have at least one dimension (e.g., a diameter) of from 1 µm to 2000 µm (e.g., 1 to 1000 or 1 µm to 200 µm)), inclusive, and all values, including integer values, therebetween.

Statement 4. A solid-state electrolyte structure according to any one of the preceding Statements, where the at least one dimension (e.g., diameter) of the at least one feature is from 1 µm to 200 µm, inclusive, and all values, including integer values, therebetween.

Statement 5. A solid-state electrolyte structure according to any one of the preceding Statements, where the substrate has a thickness less than or equal to 100 µm (e.g., 5 to 30 µm).

Statement 6. A solid-state electrolyte structure according to any one of the preceding Statements, where the second ion-conducting material is the same or different from the first ion-conducting material.

Statement 7. A solid-state electrolyte structure according to any one of the preceding Statements, where the first ordered porous microstructure comprises a columnar structure, a plurality of columnar structures, a line structure, a grid structure, a multilayer grid structure, or a combination thereof.

Statement 8. A solid-state electrolyte structure according to any one of the preceding Statements, where the feature is a line, and the first ordered porous microstructure is a layer of parallel lines arranged on the first surface of the substrate.

Statement 9. A solid-state electrolyte structure according to Statement 8, where the plurality of parallel lines is a raster pattern formed from a contiguous line.

Statement 10. A solid-state electrolyte structure according to Statement 8, where the first ordered porous microstructure comprises a second layer of parallel lines disposed on the first layer of parallel lines.

Statement 11. A solid-state electrolyte structure according to Statement 10, where the second layer of parallel lines is at a grid angle relative to the parallel lines of the first layer.

Statement 12. A solid-state electrolyte structure according to Statement 11, where the grid angle is from 1 and 90, inclusive, and all values, including integer values, therebetween.

Statement 13. A solid-state electrolyte structure according to Statement 8, the first ordered porous microstructure comprises a plurality of layers (e.g., 2 to 100 layers), each layer comprising parallel lines of the second ion-conducting material disposed on an adjacent layer of parallel lines Statement 14. A solid-state electrolyte structure according to any one of the preceding Statements, where the feature is a column extending in a direction generally perpendicular to the first surface of the substrate, and the microstructure is a plurality of features arranged in a two-dimensional array on the first surface of the substrate.

Statement 15. A solid-state electrolyte structure according to Statement 14, where each column has a height of from 1 µm to 1000 µm, inclusive, and all values, including integer values, therebetween.

Statement 16. A solid-state electrolyte structure according to Statement 15, where each column has a height of from 50 µm to 200 µm, inclusive, and all values, including integer values, therebetween.

Statement 17. A solid-state electrolyte structure according to any one of the preceding Statements, where the substrate has a second surface opposite the first surface, and further comprising a second ordered porous microstructure described herein disposed on the second surface of the substrate, the second ordered porous microstructure having pores defined by at least one second feature, the at least one second feature having a diameter of less than 200 µm, and the second feature comprising a third ion-conducting material.

Statement 18. A solid-state electrolyte structure according to Statement 17, where the third ion-conducting material described herein is the same as the first ion-conducting material and/or the second ion-conducting material or different from the first ion-conducting material and/or the second ion-conducting material.

Statement 19. A solid-state electrolyte structure according to Statement 17, where the second ordered porous microstructure comprises a plurality of columnar structures, a line structure, a grid structure, or a multilayer grid structure.

Statement 20. A solid-state electrolyte structure according to Statement 17, where the solid-state electrolyte structure (e.g., the first ordered porous microstructure, the second ordered porous microstructure, the substrate, or a combination thereof) comprises (e.g., is) an ion-conducting polymer material, an ion-conducting inorganic material (e.g., a ceramic material), or a combination thereof.

Statement 21. A solid-state electrolyte structure according to any one of the preceding Statements, where the substrate has a second surface opposite the first surface, and further comprising a random ordered porous microstructure described herein comprising an ion-conducting material disposed on the second surface of the substrate.

Statement 22. A solid-state electrolyte structure according to any one of the preceding Statements, where the ion-conducting material is an ion-conducting polymeric material.

Statement 23. A solid-state electrolyte structure according to any one of the preceding Statements, where the ion-conducting polymeric material comprises an ion-conducting polymer described herein (e.g., an ion-conducting polymer chosen from poly(ethylene) (PE), poly(ethylene oxide) (PEO), poly(propylene) (PP), poly(propylene oxide), PEO containing copolymers (e.g., polystyrene (PS)-PEO copolymers and poly(methyl methacrylate) (PMMA)-PEO copolymers), polyacrylonitrile (PAN), poly(acrylonitrile-co-methylacrylate), PVdF containing copolymers (e.g., polyvinylidene fluoride-co-hexafluoropropylene (PVdF-co-HFP)), PMMA copolymers (e.g., poly(methylmethacrylate-co-ethylacrylate)), and combinations thereof) and, optionally, a conducting salt (e.g., a lithium salt such as, for example, LiTFSE, or an ionic liquid).

Statement 24. A solid-state electrolyte structure according to any one of the preceding Statements, where the ion-conducting material is a lithium-ion-conducting material described herein, sodium-ion-conducting material described herein, or magnesium-ion-conducting material described herein.

Statement 25. A solid-state electrolyte structure according to Statement 24, where the lithium-ion-conducting material is a lithium-garnet material herein.

Statement 26. A solid-state electrolyte structure according to Statement 25, where the lithium-garnet material is $Li_{7-x}La_{3-y}M^1_yZr_{2-z}M^2_zO_{12}$, where x greater than 0 and less than 2, $M^1$ is chosen from Ba, Ca, Y, and combinations thereof, and $M^2$ is chosen from Nb, Ta, and combinations thereof.

Statement 27. A solid-state electrolyte structure according to Statement 25, where the lithium-garnet material is cation-doped $Li_5La_3M^2{}_2O_{12}$, where $M^2$ is Nb, Zr, Ta, or combinations thereof, cation-doped $Li_6La_2BaTa_2O_{12}$, cation-doped $Li_7La_3Zr_2O_{12}$, or cation-doped $Li_6BaY_2M^2{}_2O_{12}$ where $M^2$ is Nb, Zr, Ta, or combinations thereof, where the cation dopants are barium, yttrium, zinc, or a combination thereof.

Statement 28. A solid-state electrolyte structure according to Statement 25, where the lithium-garnet material is $Li_5La_3Nb_2O_{12}$, $Li_5La_3Ta_2O_{12}$, $Li_7La_3Zr_2O_{12}$, $Li_6La_2SrNb_2O_{12}$, $Li_6La_2BaNb_2O_{12}$, $Li_6La_2SrTa_2O_{12}$, $Li_6La_2BaTa_2O_{12}$, $Li_7Y_3Zr_2O_{12}$, $Li_{6.4}Y_3Zr_{1.4}Ta_{0.6}O_{12}$, $Li_{6.5}La_{2.5}Ba_{0.5}TaZrO_{12}$, $Li_6BaY_2M^1{}_2O_{12}$, $Li_7Y_3Zr_2O_{12}$, $Li_{6.75}BaLa_2Nb_{1.75}Zn_{0.25}O_{12}$, $Li_{6.75}BaLa_2Ta_{1.75}Zn_{0.25}O_{12}$, or a combination thereof.

Statement 29. A solid-state electrolyte structure according to Statement 24, where the sodium-conducting material is $Na_3Zr_2Si_2PO_{12}$ (NASICON) or beta-alumina.

Statement 30. A solid-state electrolyte structure according to Statement 24, where the magnesium-conducting material is $MgZr_4P_6O_{24}$.

Statement 31. A solid-state electrolyte structure according to Statement 25, where the ion-conducting material comprises crystalline domains, polycrystalline domains, amorphous domains, or a combination thereof (e.g., is polycrystalline or amorphous or a combination thereof).

Statement 32. A solid-state electrolyte structure according to any one of the preceding Statements, further comprising a cathode material disposed on at least a portion of the first ordered porous microstructure.

Statement 33. An electrochemical device according to Statement 32, where the ion-conducting cathode material comprises a conducting carbon material, and the ion-conducting cathode material, optionally, further comprises an organic or gel ion-conducting electrolyte.

Statement 34. A solid-state electrolyte structure according to Statement 32, where the cathode material is sulfur, air, or oxygen.

Statement 35. A solid-state electrolyte structure according to Statement 32, where the cathode material is a lithium-containing cathode material, a sodium-containing cathode material, or a magnesium-containing cathode material.

Statement 36. A solid-state electrolyte structure according to Statement 35, where the lithium-containing cathode material is chosen from $LiCoO_2$, $LiFePO_4$, $Li_2MMn_3O_8$, where M is selected from Fe, Co, and combinations thereof, $LiMn_2O_4$, $LiNiCoAl_2$, $LiNi_xMn_yCo_zO_2$, where x+y+z=1 (e.g., 0.5:0.3:0.2), and combinations thereof.

Statement 37. A solid-state electrolyte structure according to Statement 35, where the sodium-containing material is chosen from $Na_2V_2O_5$, $P2-Na_{2/3}Fe_{1/2}Mn_{1/2}O_2$, $Na_3V_2(PO_4)_3$, $NaMn_{1/3}Co_{1/3}Ni_{1/3}PO_4$, and $Na_{2/3}Fe_{1/2}Mn_{1/2}O_2$@graphene composite, and combinations thereof.

Statement 38. A solid-state electrolyte structure according to Statement 36, where the magnesium-containing material is chosen from doped manganese oxides, and combinations thereof.

Statement 39. A solid-state electrolyte structure according to any one of the preceding Statements, further comprising an anode material described herein disposed on at least a portion of the first ordered porous microstructure.

Statement 40. A solid-state electrolyte structure according to Statement 39, where the anode is a metal anode described herein (e.g., lithium metal, sodium metal, or magnesium metal).

Statement 41. A solid-state electrolyte structure according to Statement 39, where the anode is a lithium-containing anode material described herein, a sodium-containing material described herein, or a magnesium containing material herein.

Statement 42. A solid-state electrolyte structure according to Statement 41, where the lithium-containing anode material is chosen from lithium titanate ($Li_4Ti_5O_{12}$), and combinations thereof.

Statement 43. A solid-state electrolyte structure according to Statement 41, where the sodium-containing anode material is chosen from $Na_2CH_4O_4$, $Na_{0.66}Li_{0.22}Ti_{0.78}O_2$, and combinations thereof.

Statement 44. A solid-state electrolyte structure according to Statement 43, where the magnesium-containing anode material is chosen from $Mg_2Si$, and combinations thereof.

Statement 45. A solid-state electrolyte structure according to Statement 39, where the anode comprises carbon, silicon, tin, or a combination thereof (e.g., Si—C, Sn—C, $Si_xSn_y$, SiO, and the like).

Statement 46. A solid-state electrolyte structure according to any one of the preceding Statements, where the microstructure is a cathode-side porous microstructure and the microstructure comprises a plurality of columnar structures and the cathode material is a lithium-containing material or the microstructure comprises a grid structure or multilayer grid structure and cathode material is sulfur.

Statement 47. A solid-state electrolyte structure according to any one of the preceding Statements, where the substrate (e.g., dense layer) of the solid-state electrolyte structure has at least one dimension (e.g., a thickness) of 1 μm to 100 μm (e.g., 5 μm to 30 μm or 10 μm to 20 μm) and/or the ordered porous microstructure of the solid-state electrolyte structure that has the cathode material disposed thereon has at least one dimension (e.g., a thickness) of 1 m to 1 mm (e.g., 20 μm to 200 μm) and/or the ordered porous microstructure of the solid-state electrolyte structure that has the anode material disposed thereon has at least one dimension (e.g., a thickness) 1 μm to 1 mm (e.g., 20 μm to 200 μm).

Statement 48. An electrochemical device comprising one or more solid-state electrolyte structure according to any one of the preceding Statements.

Statement 49. An electrochemical device according to Statement 48, where the electrochemical device is an ion-conducting battery, electrolysis cell, a capacitor, fuel cell or fuel cell/battery.

Statement 50. An electrochemical device according to Statement 48, where the electrochemical device is a solid-state, ion-conducting battery comprising: a cathode material or an anode material (e.g., a cathode material or anode material described herein); a solid-state electrolyte structure (e.g., a solid-state electrolyte structure such as, for example, the solid-state electrolyte structure according to Statement 1), where the cathode material or the anode material is disposed on at least a portion of the ordered porous region of the solid-state electrolyte structure and the dense region is free of the cathode material and the anode material, and a current collector (e.g., a current collector described herein) disposed on at least a portion of the cathode material or the anode material.

Statement 51. An electrochemical device according to Statement 50, where the solid-state electrolyte structure comprises: a cathode-side current collector; or an anode-side current collector.

Statement 52. An electrochemical device according to Statement 50 or 51, where the current collector or the cathode-side current collector or anode-side current collector is a conducting metal, a conducting metal alloy, or comprises (or is) carbon. E.g., the current collector(s) is or are independently a conducting metal, a conducting metal alloy, or comprises (or is) carbon.

Statement 53. An electrochemical device according to any one of Statements 50-52, where the cathode material, if present, the anode material, if present, the solid-state electrolyte structure, and the current collector form a cell, and the solid-state, ion-conducting battery comprises a plurality of the cells, each adjacent pair of the cells is separated by a bipolar plate.

Statement 54. An electrochemical device according to any one of Statements 50-53, where the solid-state electrolyte structure of the ion-conducting solid-state battery is configured such that ions (e.g., lithium ions, sodium ions, or magnesium ions) diffuse into and out of the ordered porous region of the solid-state electrolyte structure during charging and/or discharging of the battery.

Statement 55. A 3-D printable composition comprising: i) an ion-conducting material described herein (e.g., an ion-conducting polymer described herein, an ion-conducting inorganic material described herein, such as for example, an ion-conducting inorganic material (e.g., a powder), or an ion-conducting hybrid polymer/inorganic material described herein (e.g., comprising a ion-conducting polymeric material described herein and a ion-conducting inorganic material described herein)), or ii) a combination of precursor materials described herein (e.g., powders) (such as, for example, metal oxides, carbonates, nitrates, and the like) that when heated form an ion-conducting inorganic material described herein (e.g., an ion-conducting ceramic material); and at least one of a dispersant described herein, a binder described herein, a plasticizer described herein, or a solvent described herein. E.g., weight % of the ion-conducting material or combination of precursor materials and, if present, dispersant(s), binder(s); plasticizer(s) and solvent(s) equals 100%.

Statement 56. A 3-D printable composition according to Statement 55, where the ion-conducting material is a polymeric material (e.g., comprising an ion-conducting polymer, an ion-conducting copolymer, or a combination thereof).

Statement 57. A 3-D printable composition according to Statement 56, where the polymeric material comprises an ion-conducting polymer described herein (e.g., an ion-conducting polymer chosen from poly(ethylene) (PE), poly (ethylene oxide) (PEO), poly(propylene) (PP), poly(propylene oxide), PEO containing copolymers (e.g., polystyrene (PS)-PEO copolymers and poly(methyl methacrylate) (PMMA)-PEO copolymers), polyacrylonitrile (PAN), poly (acrylonitrile-co-methylacrylate), PVdF containing copolymers (e.g., polyvinylidene fluoride-co-hexafluoropropylene (PVdF-co-HFP)), PMMA copolymers (e.g., poly(methyl-methacrylate-co-ethylacrylate)), and combinations thereof.

Statement 58. A 3-D printable composition according to Statement 56 or 57, where the polymeric material comprises a conducting salt described herein (e.g., an ionic liquid).

Statement 59. A 3-D printable composition according to any one of Statements 55-58, where the ion-conducting materials or combination of precursor materials (e.g., metal oxide, carbonates, nitrates, and or the like) is/are present at 10 to 90 wt. % (based on the total weight of the composition) (e.g., 50 to 80 wt. % or 60 to 66 wt. %).

Statement 60. A 3-D printable composition according to any one of Statements 55-59, where the ion-conducting material is a lithium-ion-conducting material described herein, sodium-ion-conducting material described herein, or magnesium-ion-conducting material described herein.

Statement 61. A 3-D printable composition according to Statement 60, where the lithium-ion-conducting material is a lithium-garnet ceramic material described herein.

Statement 62. A 3-D printable composition according to Statement 61, where the lithium-garnet ceramic material is $Li_{7-x}La_{3-y}M^1{}_yZr_{2-z}M^2{}_zO_{12}$, where x greater than 0 and less than 2, $M^1$ is chosen from Ba, Ca, Y, and combinations thereof, and $M^2$ is chosen from Nb, Ta, and combinations thereof.

Statement 63. A 3-D printable composition according to Statement 61, where the lithium-garnet material is cation-doped $Li_5La_3M^2{}_2O_{12}$, where $M^2$ is Nb, Zr, Ta, or combinations thereof, cation-doped $Li_6La_2BaTa_2O_{12}$, cation-doped $Li_7La_3Zr_2O_{12}$, or cation-doped $Li_6BaY_2M^2{}_2O_{12}$ where $M^2$ is Nb, Zr, Ta, or combinations thereof, where the cation dopants are barium, yttrium, zinc, or a combination thereof.

Statement 64. A 3-D printable composition according to Statement 61, where the lithium-garnet ceramic material is $Li_5La_3Nb_2O_{12}$, $Li_5La_3Ta_2O_{12}$, $Li_7La_3Zr_2O_{12}$, $Li_6La_2SrNb_2O_{12}$, $Li_6La_2BaNb_2O_{12}$, $Li_6La_2SrTa_2O_{12}$, $Li_6La_2BaTa_2O_{12}$, $Li_7Y_3Zr_2O_{12}$, $Li_{6.4}Y_3Zr_{1.4}Ta_{0.6}O_{12}$, $Li_{6.5}La_{2.5}Ba_{0.5}TaZrO_{12}$, $Li_6BaY_2M^1{}_2O_{12}$, $Li_7Y_3Zr_2O_{12}$, $Li_{6.75}BaLa_2Nb_{1.75}Zn_{0.25}O_{12}$, $Li_{6.75}BaLa_2Ta_{1.75}Zn_{0.25}O_{12}$, or a combination thereof.

Statement 65. A 3-D printable composition according to Statement 60, where the sodium-conducting material is $Na_3Zr_2Si_2PO_{12}$ (NASICON) or beta-alumina.

Statement 66. A 3-D printable composition according to Statement 60, where the magnesium-conducting material is $MgZr_4P_6O_{24}$.

Statement 67. A 3-D printable composition according to any one of Statements 55-66, where the ion-conducting material comprises crystalline domains, polycrystalline domains, amorphous domains, or a combination thereof (e.g., is polycrystalline or amorphous) or is single crystalline.

Statement 68. A 3-D printable composition according to any one of Statements 55-67, where the ion-conducting material is ion-conducting material containing particles (e.g., lithium-, sodium-, or magnesium-containing material particles) and the ion-conducting material containing particles (e.g., lithium-, sodium-, or magnesium-containing material particles) have an average size (e.g., longest dimension) of 10 to 10,000 nm (e.g., 50 to 500 nm) or the ceramic powder particles described herein have an average size (e.g., longest dimension) of 10 to 10,000 nm (e.g., 50 to 500 nm).

Statement 69. A 3-D printable composition according to any one of Statements 55-68, where the dispersant is present at 0.01 to 10 wt. % (based on the total weight of the composition) (e.g., 0.5 to 1 wt %).

Statement 70. A 3-D printable composition according to any one of Statements 55-69, where the dispersant is chosen from blown menhadden fish oil, corn oils, safflower oils, linseed oils, glycerol trioleate, poly(vinyl butyral), fatty acid esters, and combinations thereof.

Statement 71. A 3-D printable composition according to any one of Statements 55-70, where the binder is present at 20 to 50 wt. % (based on the total weight of the composition) (e.g., 30 to 38 wt %).

Statement 72. A 3-D printable composition according to any one of Statements 55-71, where the binder is chosen from vinyl polymers (e.g., polyvinylbutyrals (PVBs), polyvinyl alcohols, polyvinyl chlorides, and the like), acrylic polymers (e.g., polyacrylate esters, polymethyl methacrylates, polyethyl acrylates, and the like), celluloses (e.g., methyl celluloses, ethyl celluloses, hydroxyethyl celluloses, and the like); polyethylenes, polypropylene carbonates, polytetrafluoroethylenes, and ESL 441 (proprietary texanol-based composition), and combinations thereof (e.g., ethyl cellulose as the use of a binder with alpha-terpineol solvent).

Statement 73. A 3-D printable composition according to any one of Statements 55-72, where the plasticizer is present at 0 to 20 wt. % (based on the total weight of the composition).

Statement 74. A 3-D printable composition according to any one of Statements 55-73, where the plasticizer is chosen from phthalates (e.g., alkyl phthalates, such as, for example, n-butyl phthalate, dimethyl phthalate, and the like, and aryl phthalyates, such as, for example, benzylbutyl phthalate (BBP), and the like), polyols (e.g., glycerol, glycols, such as, for example, polyethylene glycol, polyalkylene glycol, polypropylene glycol, triethylene glycol, and the like), trialkyl phosphates (e.g., tri-n-butyl phosphate, and the like), and the like, and combinations thereof.

Statement 75. A 3-D printable composition according to any one of Statements 55-74, where the solvent is present at 0 to 10 wt. % (based on the total weight of the composition) (e.g., 0.01 to 3 wt. %).

Statement 76. A 3-D printable composition according to any one of Statements 55-75, where the solvent is chosen from alcohols (e.g., ethanol, propanols (such as for example, isopropanol and n-propanol), butanols (such as, for example, n-butanol), pentanols, hexanols, and the like), toluene, xylenes, methyl ethyl ketone, alpha-terpineol, water, and combinations thereof.

Statement 77. A 3-D printable composition according to any one of Statements 55-76, where the composition has a viscosity of 100 to 1,000,000 cP (e.g., 500 to 50,000 cP) and/or the yield stress is greater than 0 Pa or equal to 0 Pa.

Statement 78. A method of making an ordered porous solid state electrolyte comprising: depositing a preselected amount of a composition of any one of Statements 55 to 77 to form a first layer of the composition of any one of Statements 55 to 77 (e.g., comprising a feature or a plurality of features as described herein) disposed on a dense layer such that a first layer of precursor material (i.e., ordered solid state electrolyte precursor material) (e.g., comprising a feature or a plurality of features as described herein) disposed on the dense layer is formed; optionally, depositing a preselected amount a composition of any one of Statements 55 to 77 to form a second layer of the composition of any one of Statements 55 to 77 such that at a second layer of precursor material (i.e., ordered solid state electrolyte precursor material) (e.g., comprising a feature or a plurality of features as described herein) is formed, where the second layer of precursor material (i.e., ordered solid state electrolyte precursor material) (e.g., comprising a feature or a plurality of features as described herein) is disposed on a least a portion of the first layer of precursor material (i.e., ordered solid state electrolyte precursor material); optionally, waiting a predetermined amount of time and/or heating the layer; optionally, repeating the depositing from b), and, optionally, c), a desired number of times; and e) drying the layer(s) (e.g., removing liquid(s) such as, for example, solvent(s)) of precursor material (i.e., ordered solid state electrolyte precursor material/structure); and e) heating (e.g., sintering, in, for example, an atmosphere, such as for example, an oxygen atmosphere) the layer(s) of precursor material (i.e., ordered solid state electrolyte precursor material/structure) in a bed of the mother ceramic powder) the ordered solid-state electrolyte precursor material structure to form the ordered porous solid state electrolyte.

Statement 79. A method according to Statement 78, where the exposing and forming is carried out using a 3D printer (e.g., the dispensing is from at least one printing head).

Statement 80. A method according to Statement 78 or 79, where all of the layers of ordered solid state electrolyte material have the same nominal composition (e.g., are formed from the same 3-D printable composition).

Statement 81. A method according to any one of Statements 78-80, where two or more of the layers of ordered solid state electrolyte material have different nominal composition (e.g., are formed from two or more 3-D printable compositions).

Statement 82. A method according to any one of Statements 78-81, where the depositing a first layer of a composition of any one of Statements 55 to 77 comprises depositing a first composition of any one of Statements 55 to 77 and a first composition of any one of Statements 55 to 77 to form a first layer having regions with different nominal composition.

Statement 83. A method according to any one of Statements 78-81, where the depositing a first layer of a composition of any one of Statement 55 to 77 forms a first structure and the depositing a second layer of a composition of any one of Statement 55 to 77 forms a second structure and the first structure and second structure have different shape.

The following examples are presented to illustrate the present disclosure. They are not intended to limiting in any matter.

Example 1

This example provides a description of solid-state electrolyte structures, devices comprising the solid-state electrolyte structures and characterization of same, methods of making solid-state electrolyte structures, and 3-D printable compositions.

This examples describes a sampling of structures printed and sintered revealing thin, and non-planar, intricate architectures comprised of LLZ solid electrolyte. To demonstrate the efficacy of the garnet inks, a symmetric Li|3-D printed LLZ|Li cell is cycled with low ASR. Other designs can also be obtained with the inks described in this disclosure. Using 3-D printing with the materials described herein can provide solid-state batteries with lower full cell ASR and higher energy and power density.

Figure 2:
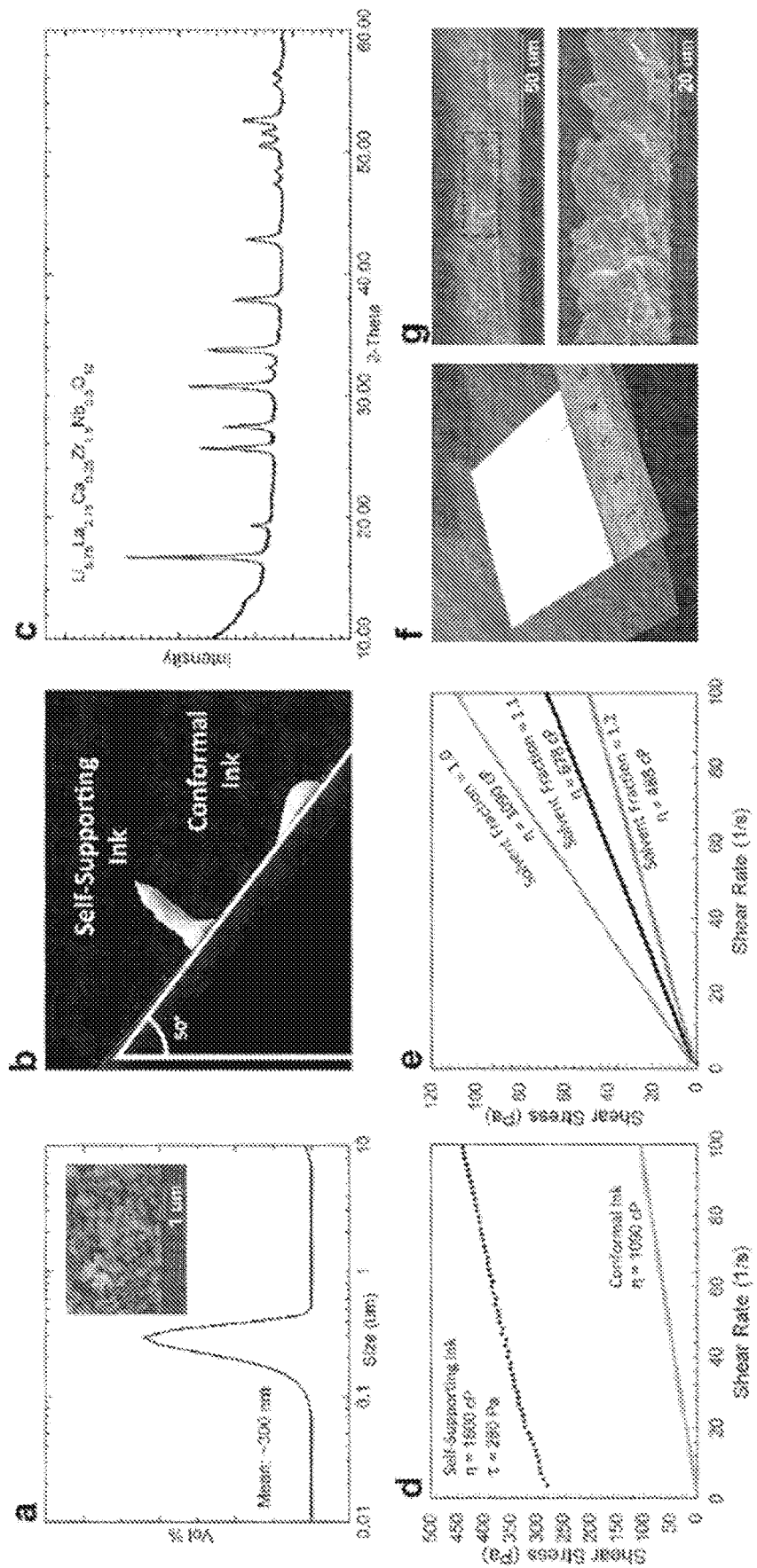
FIG. 2 shows properties of the LLZ powders and inks made from them. (a) Particle size distribution and (inset) SEM image of submicron LLZ powder. (b) Photograph of deposited inks which were tilted to ~50° demonstrating the stability of the self-supporting ink immediately after deposition. (c) XRD of the LLZ used to make the inks showing pure cubic phase garnet. (d) Rheological data for the self-supporting ink with a yield stress ($\tau$) of 280 Pa and viscosity of 1500 cP, contrasted with a conformal ink (green) with Newtonian behavior and a viscosity of 450 cP. (e) Rheological data for three conformal inks, controlling the viscosity by modifying the amount of solvent used: increasing normalized solvent fractions of 1.0 (green), 1.1 (black), and 1.2 (gray) corresponds with decreasing viscosity ($\eta$). (f) Photograph of deposited single layer of conformal ink. (g) SEM cross-sectional images of a single layer of ink after sintering with 5-10 μm thickness.

FIG. 1 shows an overview of cell fabrication using the 3-D printing process. This method is capable of printing a wide variety of ordered, high surface area LLZ structures which can be challenging to produce at the lab-scale with other methods for systematic study. Examples of these structures include lines, grids, columns, stacked arrays, or a combination. The width of the printed features first depends on the size of the nozzle that is used in the print head, which ranges from 12.5 to 125 μm. The height of the features is then easily increased by printing additional layers. However, the exact shape of the printed features and how they connect to each other and the substrate is strongly dependent on the properties of ink itself. Specifically, the particle size, binder system, solvent blend and fraction are critically important to the ink rheology and resulting structure type. In order to print micron scale features, the solid electrolyte particles are preferably more than an order of magnitude smaller than the desired feature width. Additionally, submicron particles are more easily dispersed and kept in suspension, which helps to keep the ink properties consistent throughout printing and storage. Particle size of the LLZ electrolyte can be reduced by simple ball-milling, or by a solgel synthesis route. FIG. 2a shows a typical particle size distribution (average particle size ~300 nm) and SEM image of the LLZ used for the inks.

Figure 3:
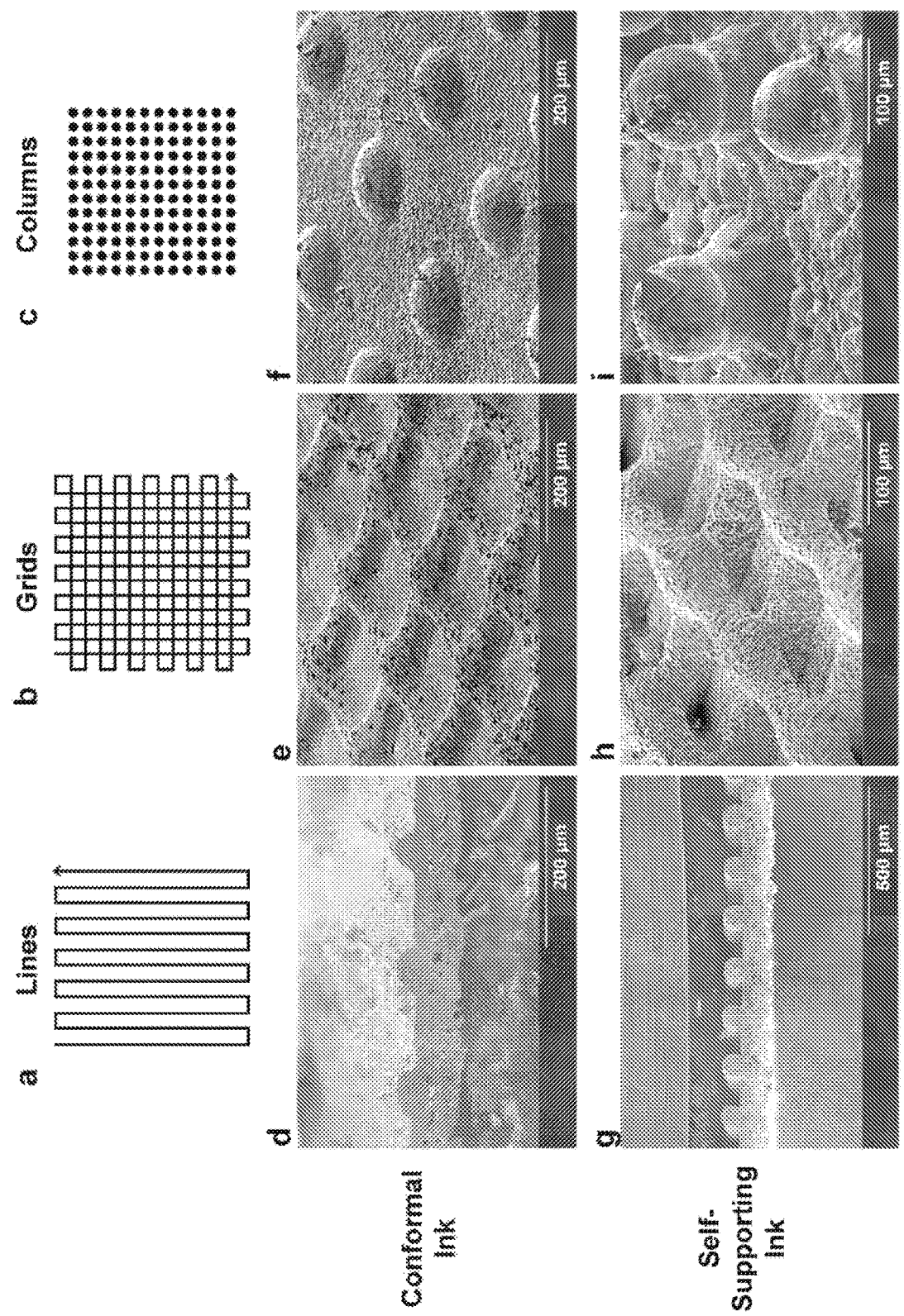
FIG. 3 shows diagrams (a-c) and SEM images (d-i) of 3-D printed LLZ microstructures comparing the printed and sintered conformal (d-f) and self-supporting (g-i) inks, including line (a, d, g), grid (b, e, h) and column (c, f, i) patterns. Each pattern was printed using similar printing scripts, with changes made to accommodate the different rheological properties of the inks.
Figure 4:
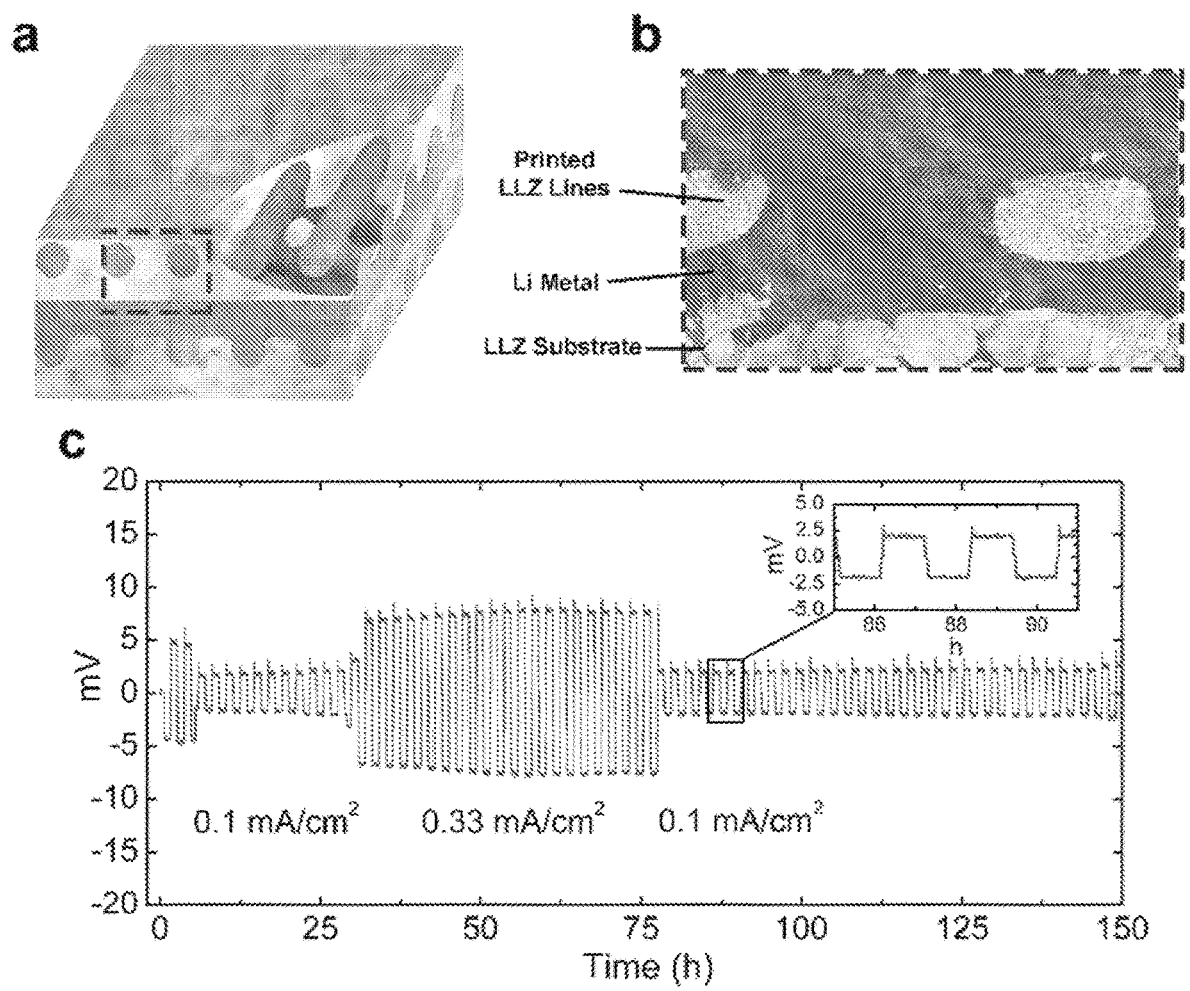
FIG. 4 shows (a) schematic of Li-filled pores between 3-D printed LLZ grids in a stacked-array pattern on LLZ substrate. (b) Cross-sectional SEM of 3-D printed LLZ|Li metal interface (red line). (c) DC cycling of Li|3-D printed LLZ|Li metal cell at varying current densities. Each plating/stripping cycle was 1 h (h=hour(s)) long.
Figure 5:
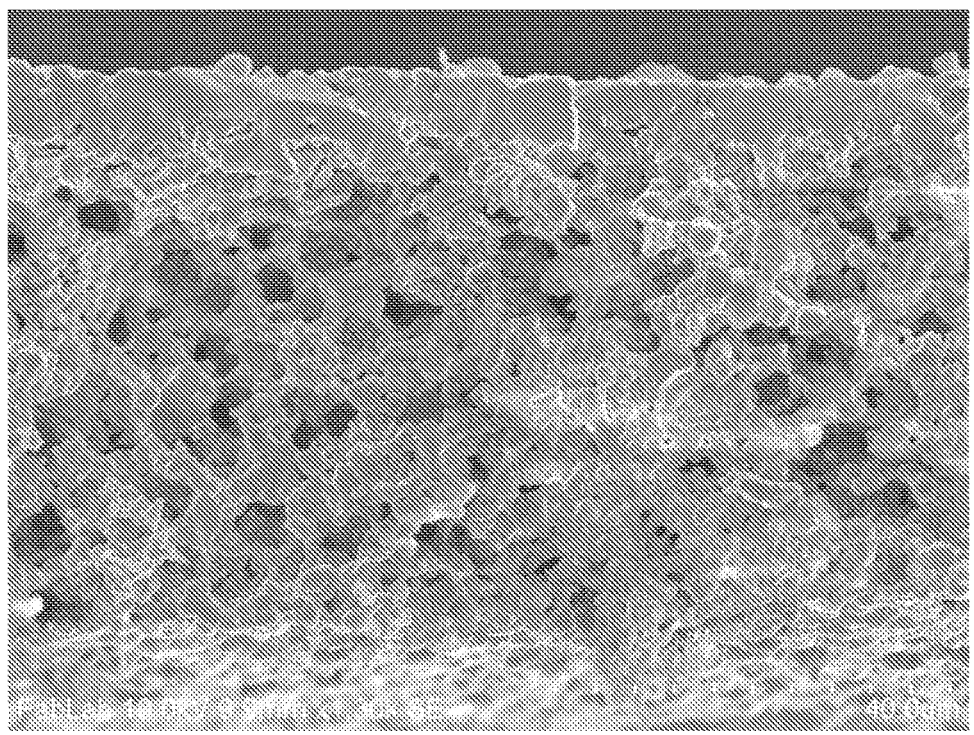
FIG. 5 shows SEM cross-sectional image of porous-dense bilayer structure, showing the ability to 3-D print inks with and without porogens to create random porosity in multi-layered structures.
Figure 6:
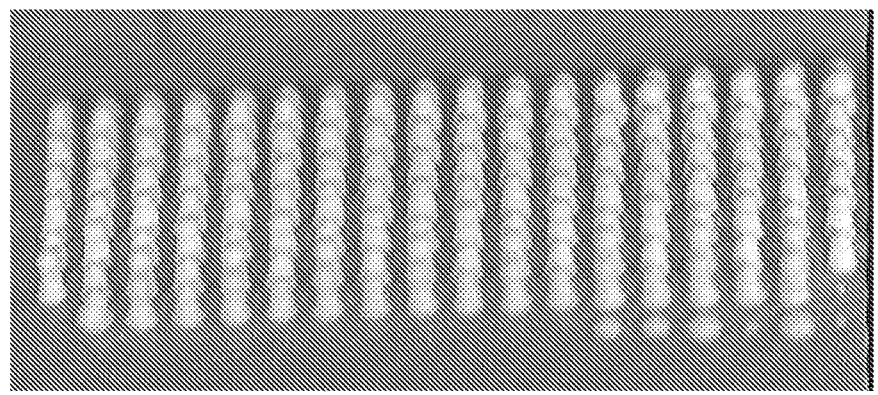
FIG. 6 shows photograph of as-printed columns using the self-supporting ink.
Figure 7:
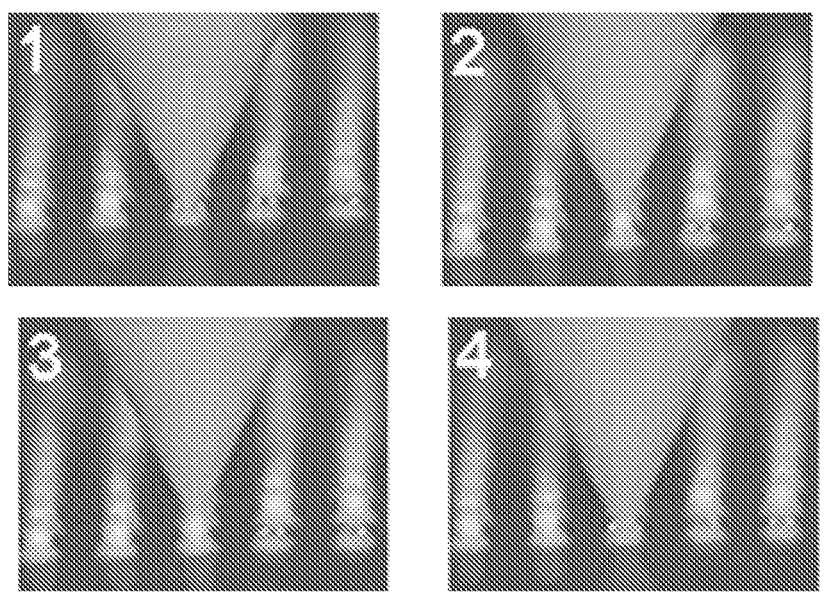
FIG. 7 shows video screenshots of the 3-D printing process. (1) The ceramic nozzle comes to the substrate surface and the dispensing ink contacts the substrate. (2-3) the nozzle moves upwards, creating a column, (4) and then moves to the right to print the next column. The 4 images above span ~1 s.

To compose the inks, two binder systems were chosen, each of which has a different impact on the ink rheology and the properties of the dispensed ink. Polyvinylbutyral (PVB) binder with benzylbutyl phthalate (BBP) plasticizer is the first binder system, and ESL 441, a proprietary texanol-based composition, is the second binder system. As shown in FIGS. 2b and 2d, the rheology of the inks with the two binder systems is dramatically different. The PVB-BBP binder-based ink exhibits Newtonian behavior and has a viscosity of 1090 cP, although the viscosity the can be easily modified by changing the amount of solvent in the ink (FIG. 2e). The ESL binder-based ink exhibits fundamentally different Bingham plastic behavior with a yield stress of 280 Pa and a viscosity of 1500 cP. The Bingham plastic behavior is a result of the ESL binder system itself and causes the ink to retain its shape unless under high shear stress. The different characteristics of the binder systems can be exploited to generate different types of printed structures. The PVB-BBP binder system produces an ink which, due to its rheological behavior, partially wets and conforms to the surface it is printed on (FIG. 3d). The PVB-BBP ink (hereafter referred to ask the "conformal ink") is well-suited for printing thin, homogenous films of solid electrolyte due to its conformal nature and seamless joinery with other lines in the pattern. A demonstration of a 5×5 cm homogenous film printed using the conformal ink is shown in FIG. 2f. By sintering a single layer of this film, a 5-10 μm free-standing high-density film has been achieved (FIG. 2g) with high purity cubic-phase LLZ garnet (FIG. 2c) and in most areas the film is only a single grain across. This demonstrates for the first time the ability to fabricate a dense layer of LLZ electrolyte that is <10 μm without costly or low production volume thin film deposition methods (e.g., PLD, ALD, etc.). A similar, more scalable tapecasting method which also used the PVB-BBP binder system recently achieved a 14 μm dense layer. A random porous-dense bilayer, such as that recently demonstrated by Hitz et al, can also be made by 3-D printing with similar inks (FIG. 5). It is therefore possible to produce exceptionally thin, high-density LLZ electrolyte, which can help resolve the high impedance problem of solid-state batteries. When used to create ordered structures, the conformal ink creates rounded lines or columns with a low aspect ratio (FIG. 3d-f). This is due to the low viscosity and wetting nature of the ink. Another characteristic of the conformal ink is its ability to create seamless joints when printed lines intersect with each other (FIG. 3e), which could be useful for create high-strength structural members, or increasing the number of ion conduction pathways.

Distinct from the conformal ink, the Bingham plastic behavior of the ESL binder ink creates structural features that maintain their shape immediately after printing (FIG. 3g-i). Remarkably, subsequent printed layers of this ink (hereafter referred to as the "self-supporting" ink) are able to support themselves without sagging after printing and through the sintering process, as shown in FIG. 3h-i which depicts the stacked array and column structures, respectively. When comparing similar designs printed with either the conformal ink (FIG. 3d-f) or the self-supporting ink (FIG. 3g-i), it is clear those printed with the self-supporting ink have a higher aspect ratio and thus a higher surface area. For example, the aspect ratios of the line patterns printed with the conformal ink (FIG. 3d) and the self-supporting ink (FIG. 3g) are 0.37 and 0.83, respectively. The stacked-array structure has an additional increase in surface area due to the exposed area created by the bottom side of the second printed layer.

A wide variety of structures can be printed using only two different types of LLZ inks, possibly enabling a rapid investigation of the effect of electrolyte-electrode interface structural properties (tortuosity, surface area, etc.) on cell characteristics and performance.

The results demonstrate the ability to 3-D print LLZ solid electrolyte that can have the same properties as LLZ pellets produced through other methods. The ability to 3-D print solid electrolytes makes fabrication of unique ordered structures possible, whereas die-pressing and tapecasting methods are limited to planar geometries and random porosities. Two types of LLZ 3-D printable inks have been developed for different structural purposes. Using the "conformal" and "self-supporting" inks, a wide variety of different structures can be created and explored, from uniform films to columns to stacked "log-cabin" type structures. It is important to note that these ink compositions are not limited to LLZ and can be used for printing other ceramic materials. These inks allow the study for solid electrolytes, one in which the effect of 3-dimensional electrolyte architectures using solid electrolytes on electrochemical and mechanical properties (i.e., electrode/electrolyte interfacial contact, cell impedance, mechanical strength, etc.) to make safe, high energy density solid-state batteries a reality.

Methods. LLZ Synthesis. Ca- and Nb-doped $Li_7La_3Zr_2O_{12}$ garnet was made by solid-state synthesis or sol-gel method as previously described. For the solid-state synthesis, stoichiometric amounts of $La_2O_3$ (GFS Chemicals, 99.9%), $ZrO_2$ (Inframat Advanced Materials), $CaCO_3$ (Carolina, Laboratory Grade), $Nb_2O_5$ (Alfa Aesar, 99.9%) and 10% excess $LiOH-H_2O$ (Alfa Aesar, 98%) were milled for 1 day with 5 mm diameter $Y_2O_3$-stabilized $ZrO_2$ (YSZ) grinding media in isopropanol. The precursors were then dried and calcined at 900° C. Phase analysis by X-ray diffraction is shown in FIG. 2c. To achieve the desired particle size, calcined powder was milled in isopropanol with 5 mm YSZ grinding media followed by 2 mm media to further reduce particle size below 1 μm. For the sol-gel method, stoichiometric amounts of $La(NO_3)_3$ (99.9%, Alfa Aesar), $ZrO(NO_3)_x$ (99.9%, Alfa Aesar), $LiNO_3$ (99%, Alfa Aesar), $NbCl_5$ (99.99%, Alfa Aesar) and $Ca(NO_3)_2$ (99.9%, Sigma Aldrich) were dissolved in de-ionized water and 5% wt excess $LiNO_3$ was added to compensate for lithium volatilization during the high-temperature processes. The precursors were calcined at 800° C. for 10 h and balled milled for 48 h in 200-proof ethanol to obtain cubic phase garnet powder (mean particle size 300 nm). Powders produced from each method were characteristically similar.

Ink Composition. For the "conformal ink," LLZ powder (37%) was first mixed with a small amount of blown menhaden fish oil (Z-3, Tape Casting Warehouse, Inc.) as dispersant in a 7:3 mixture of n-butanol (99%, Alfa Aesar): alpha-terpineol (96%, Alfa Aesar) for 24 h on a vibratory mill. Once the mixture was homogenous, polyvinyl butyral binder (PVB, B-98, Tape Casting Warehouse, Inc.) and butyl benzyl phthalate plasticizer (BBP, S-160, Tape Casting Warehouse, Inc.) were added in a 1.6:1 weight ratio to give a total solids loading of 30%. The ink was mixed in a vibratory mill for 24 h before printing.

The "self-supporting ink" was created by first producing a dilute suspension composed of 20% garnet powder, 10% Electro Science Lab (ESL) 441 texanol-based binder system, and 70% 200-proof ethanol and ball milled for 24 h to disperse the garnet powder using 2-mm yttria-stabilized zirconia spherical milling media. After ball milling, the suspension was transferred to a 250 ml HDPE jar in a Thinky mixer and mixed for 30 min at 1,500 rpm to vaporize the solvent and create the printing slurry.

3-D printing. The inks were printed with a nScrypt 3Dn-300 printer with two equipped SmartPumps and a ceramic nozzle with a nozzle opening of 12.5, 25, or 125 µm. For uniform, homogenous film fabrication, the inks were printed on a mylar sheet. To print the ordered structures the inks were printed on a porous-dense multilayer LLZ tape substrate described previously for structural support and is characteristically identical to the 3-D printed uniform films. In all cases, the printing stage was heated to 30-35° C. to facilitate the drying process. The 3-D printed structures were then sintered in a tube furnace in a bed of mother powder, similar to the sintering method described elsewhere.

Material Characterization. Phase characterization of the LLZ powder was performed at the University of Maryland's X-ray Crystallography Center using a Bruker D8 X-ray Diffractometer. Particle size data was collected for dilute solutions of LLZ in N-methyl-2-pyrrolidinone solvent and Triton X-100 dispersant using a Horiba Partica LA-950 Laser Diffraction Particle Size Distribution Analyzer. Rheology data was collected using a TA Instruments DHR-2 Rheometer at 25° C. from 1-100 Hz. A Hitachi SU-70 SEM in the UMD AIMLab and Hitachi S-3400 SEM in the UMD FabLab was used for imaging of the LLZ powder and sintered LLZ 3-D printed layers.

Example 2

This example provides a description of solid-state electrolyte structures, devices comprising the solid-state electrolyte structures and characterization of same, methods of making solid-state electrolyte structures, and 3-D printable compositions.

This example describes 3-D printing of low tortuosity garnet frameworks. The 3D porous solid state electrolyte structures prepared by the present methods are ordered and can act as electrode supports, facilitating fast ion transport within the electrodes. This can enable higher battery C-rates and thicker electrodes for higher loading. The 3D structures can also increase the mechanical strength of the solid state battery.

Figure 8:
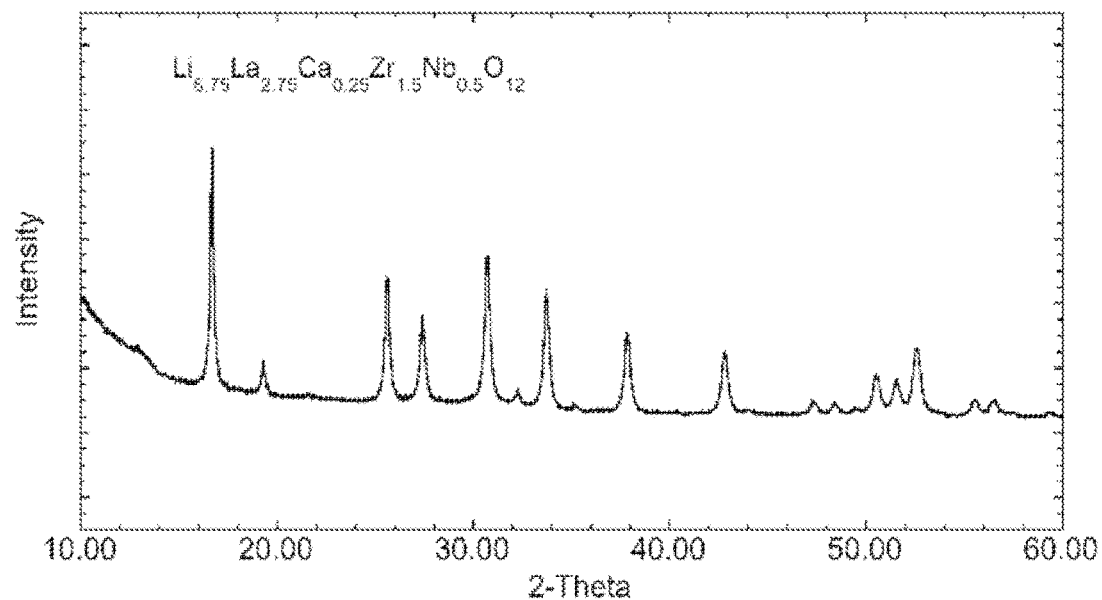
FIG. 8 shows particle size distribution and x-ray diffraction pattern of LLZ powder used for printing.
Figure 8:
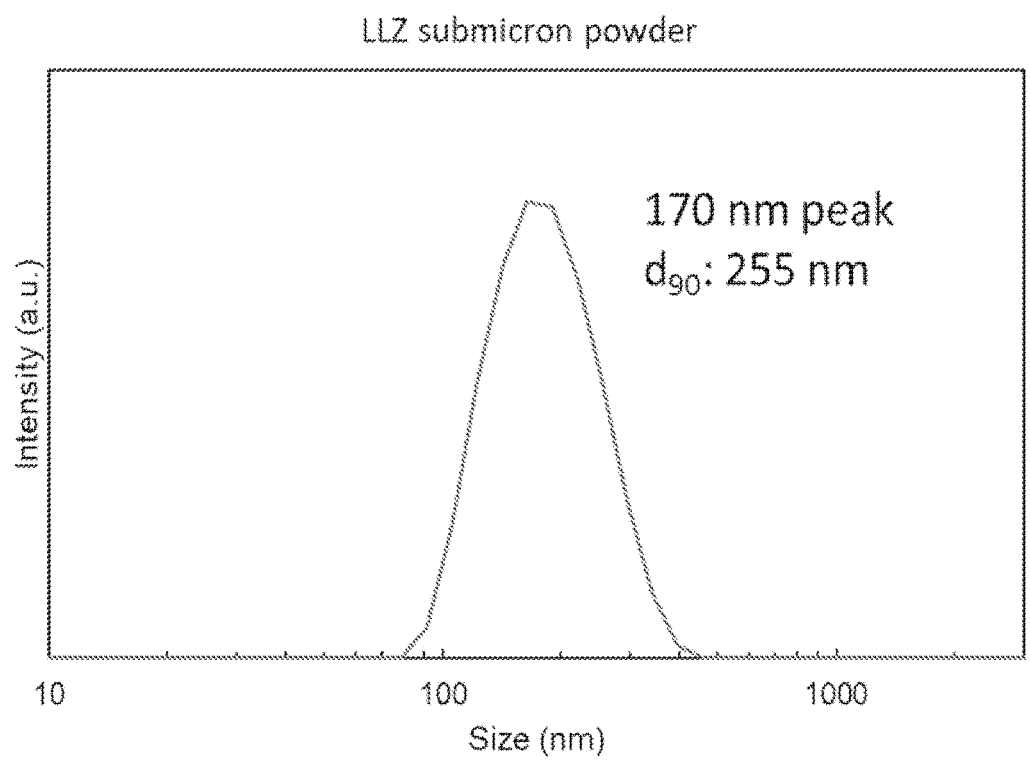
Figure 9:
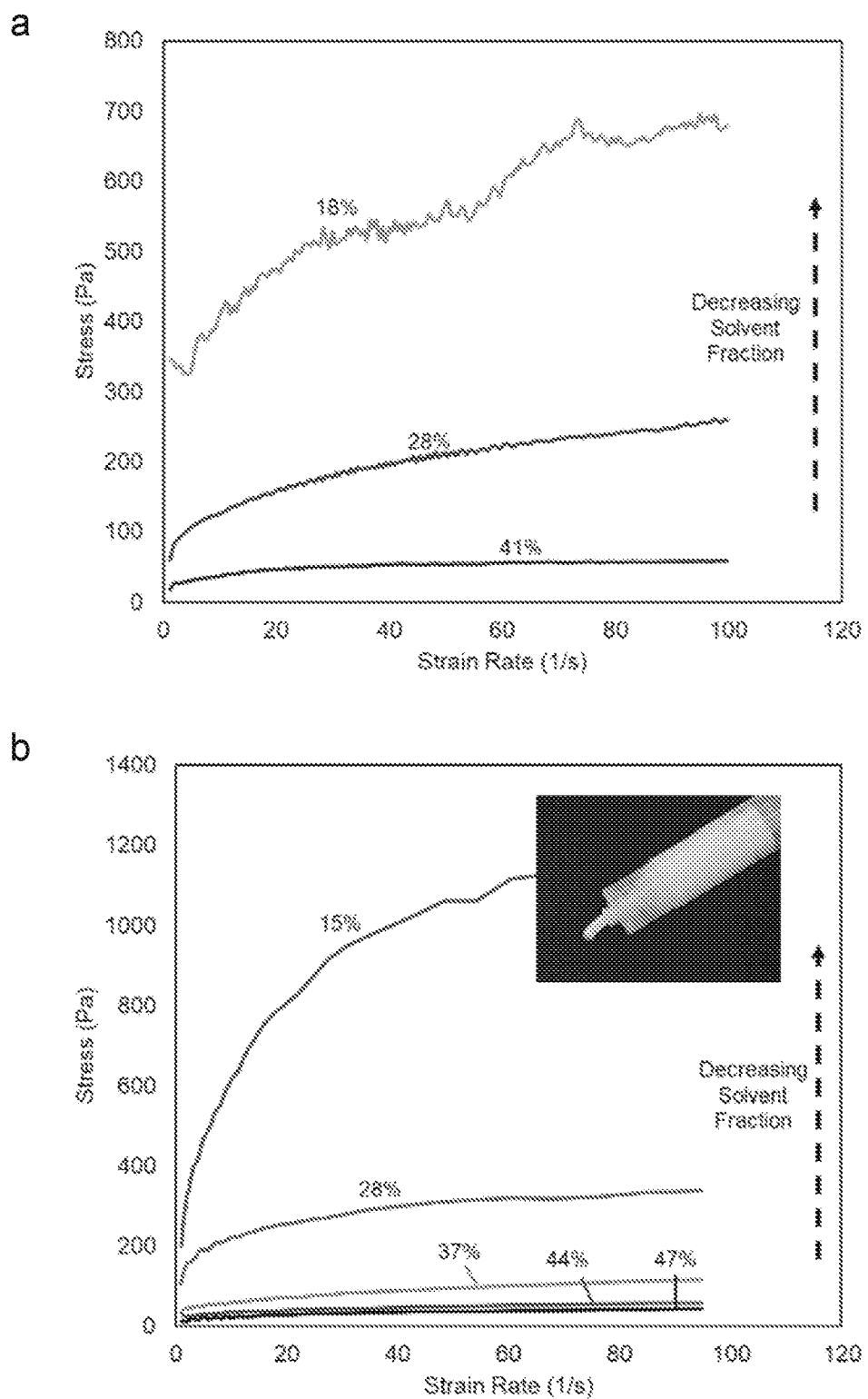
FIG. 9 shows rheological data for 3-D printing LLCZN garnet inks with a garnet:binder ratio of (a) 2.08:1 and (b) 1.85:1. The solvent wt % is indicated on each line.

Development of stable garnet ink with well dispersed garnet particles. Lithium garnet powder with the composition $Li_{6.75}La_{2.75}Ca_{0.25}Zr_{1.5}Nb_{0.5}O_{12}$ (LLZ) was synthesized by solid state reaction. XRD results show pure cubic phase garnet in FIG. 8a. The powder was then ball-milled in multiples steps with decreasing sizes of media to reduce the particle size. The $d_{90}$ of the powder was 255 nm which is suitable for 3-D printing. The ink was then mixed with an ESL binder and 200 proof ethanol to create 3-D printing inks. Several series of inks were made to test effect of the ratio of binder, garnet, and solvent concentration on viscosity. Two garnet:binder ratios were chosen (2.08:1 and 1.85:1). To these mixtures 15-50 wt % solvent was added. FIG. 9 shows the rheological properties of the different inks. FIG. 9a and 9b show the inks with garnet:binder ratios of 2.08:1 and 1.85:1, respectively. The different solvent fractions are indicated by percent in the plots. The ink with the least amount of binder (2.08:1 garnet:binder) and solvent (18% ethanol) and therefore the highest solids loading was unstable (FIG. 9a). All other inks were stable and had viscosity values from 345 cP to 52,000 cP. The most viscous ink (FIG. 9b) displayed some shear-thinning behavior as well due to the higher amount of binder and limited amount of solvent used. The inset photo in FIG. 9b shows how the high viscosity ink retains its shape after exiting the nozzle of the syringe.

Figure 10:
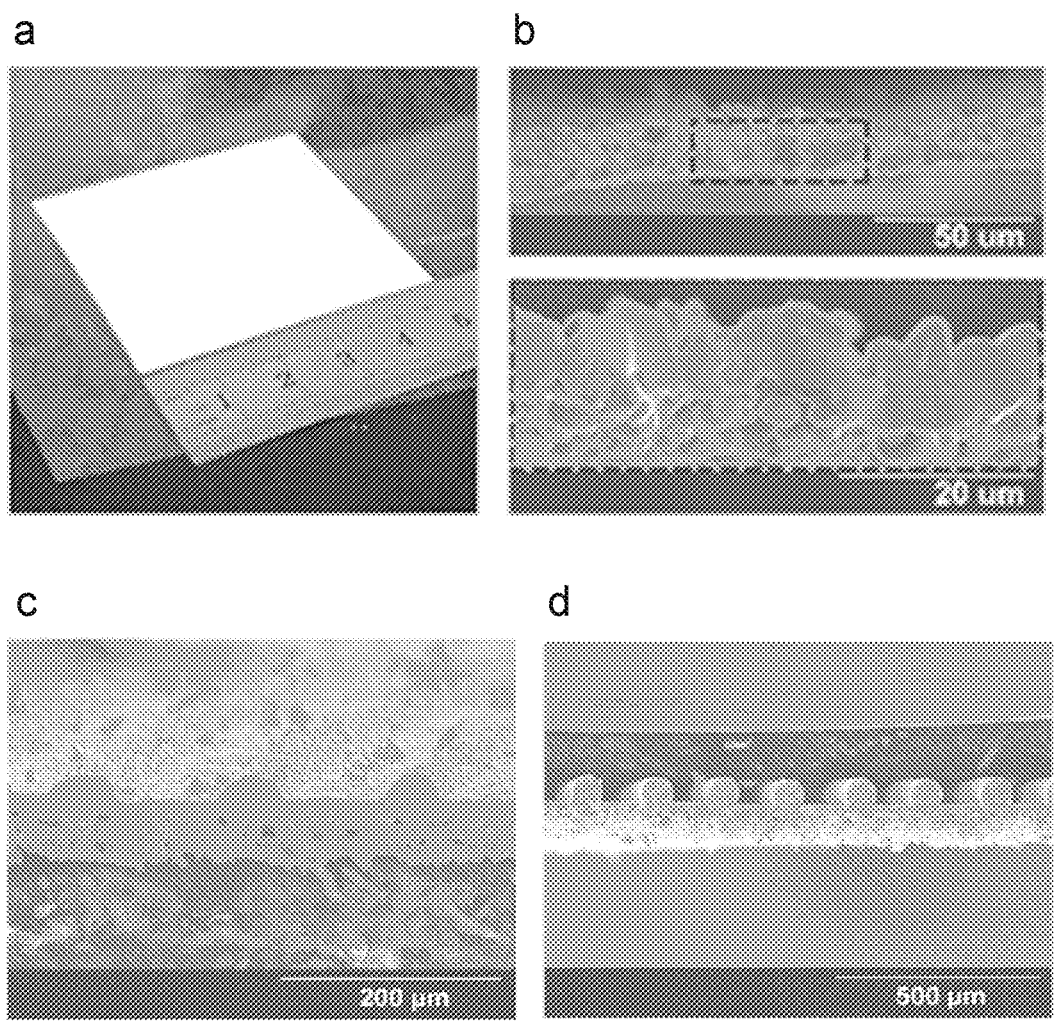
FIG. 10 shows a (a) photograph of 5×5 cm single layer thin film of 3-D printed low viscosity LLCZN ink. (b) SEM cross-sectional image of sintered film. SEM cross-sectional images of sintered LLCZN line patterns printed with (c) low viscosity conformal ink and (d) high-viscosity self-supporting ink.
Figure 11:
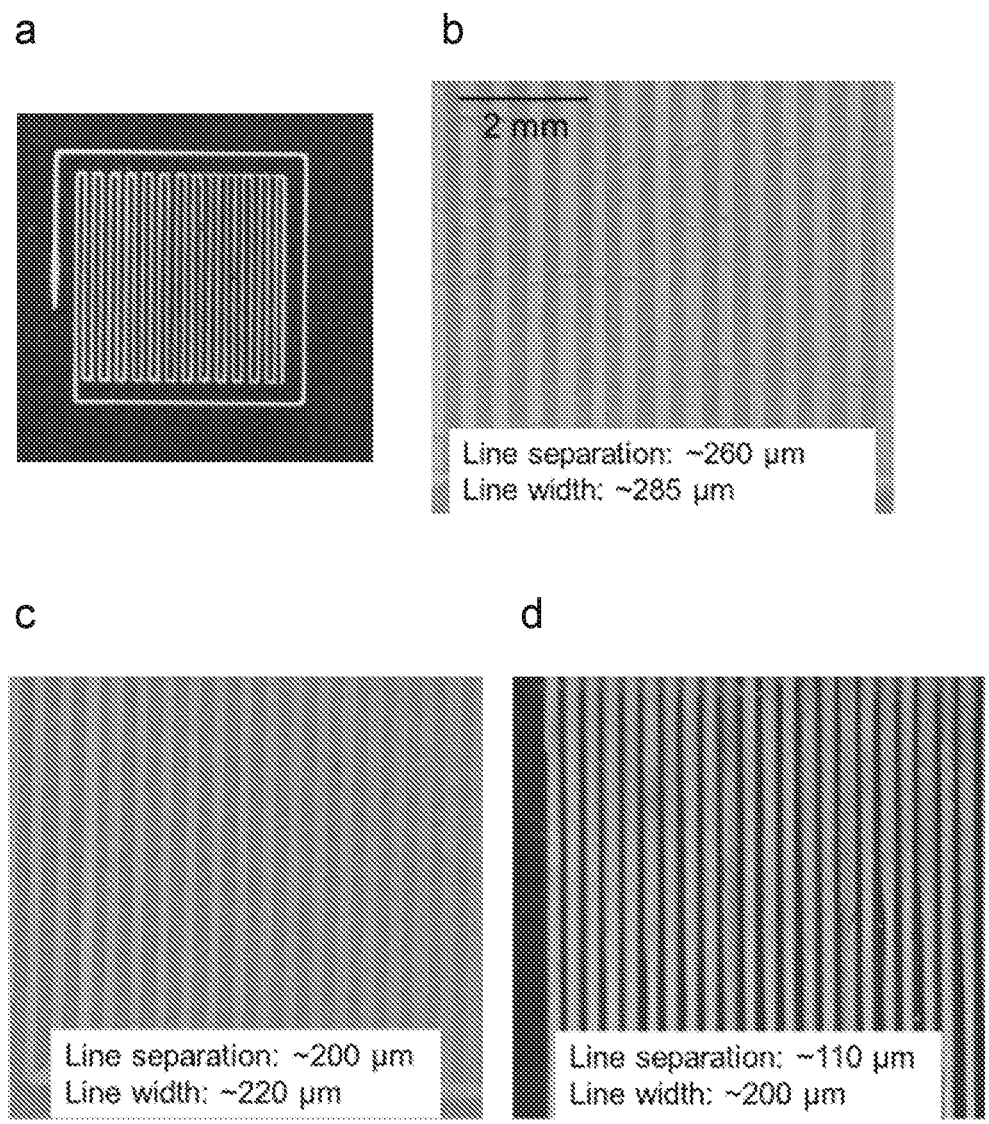
FIG. 11 shows images of 3-D printed LLCZN garnet inks. (a) Photograph of a typical print area. (b-d) Microscope images of line patterns with varying line thickness and separation by tuning the raster pattern and other printing variables.

Printing of line array structures. The stable inks were used for the 3-D printing of LLCZN. Low viscosity inks were used to print a single layer of a large-area uniform film. An example single layer film is shown in FIG. 10a. The film was then sintered to yield a film of pure LLCZN garnet with a thickness of only 5-10 µm (FIG. 10b). Varying line patterns were also printed to produce high surface area, open porosity structures. The patterns were printed onto a LLCZN tape substrate, which after sintering would serve as the electrode-separating dense layer of the cell. Low viscosity inks were first compared to high-viscosity inks. FIGS. 10c and 10d show cross-sectional SEM images of line patterns printed on LLCZN substrates using a low viscosity, more conformal ink (FIG. 10c) and a higher viscosity self-supporting ink (FIG. 10d). The lower viscosity ink results in a line which partially conforms to the surface, observed by the low contact angle. In contrast, the higher viscosity ink wets the substrate much less, and the lines maintain a round shape. Additional variations in the line pattern dimensions is shown in FIG. 11. Line widths of 200, 220, and 285 µm and line separations of 110, 200, 260 µm were achieved, demonstrating control over the 3-D printing process.

Figure 12:
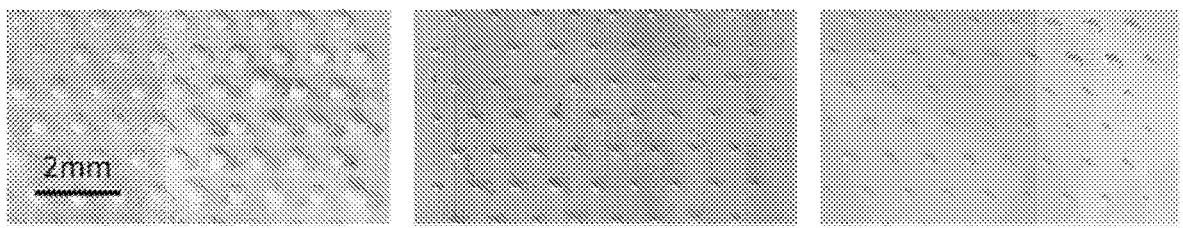
FIG. 12 shows photographs of as-printed (top) and SEM images of sintered (bottom) 3-D printed multilayer column structures on garnet substrate with aspect ratio 0.65-1.8.
Figure 12:
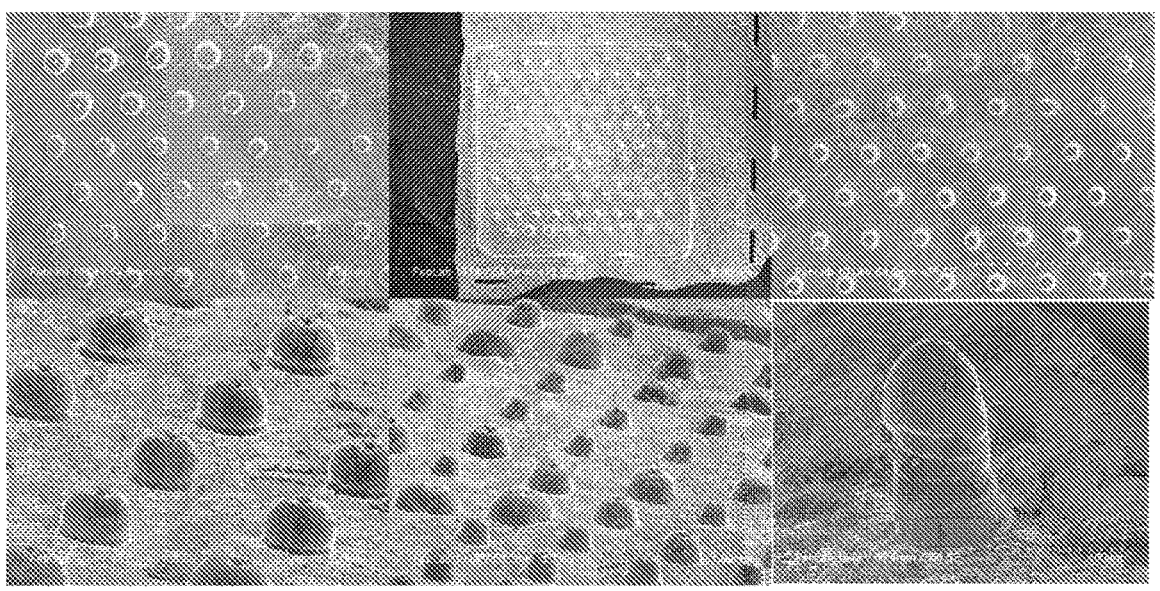

Printing of column structures. Garnet columns of varying diameter and height were 3-D printed onto a garnet tape substrate. The print areas were 1×1 cm or greater with 0.5-1 mm center to center column spacing. Photographs of the prints are shown in FIG. 12. Columns were printed with diameters from 300 µm to ~75 µm and heights ranging from 50-200 µm. The largest aspect ratio achieved was ~2.0. These values were measured before sintering, where significant shrinkage occurs due to binder burnout and densification of the garnet. FIG. 12 shows SEM images of the sintered 3-D printed columns. The maximum height of a sintered column was measured to ~180 µm with a diameter of ~100 µm, representing an aspect ratio of 1.8.

Printing of multilayer grid structures. The ink formulations were able to be tailored to optimize rheological properties for self-supporting structures such as the multilayer grid structures. Additionally, carefully controlling the drying rate has been a very important consideration to prevent structure degradation between printing and sintering.

Figure 13:
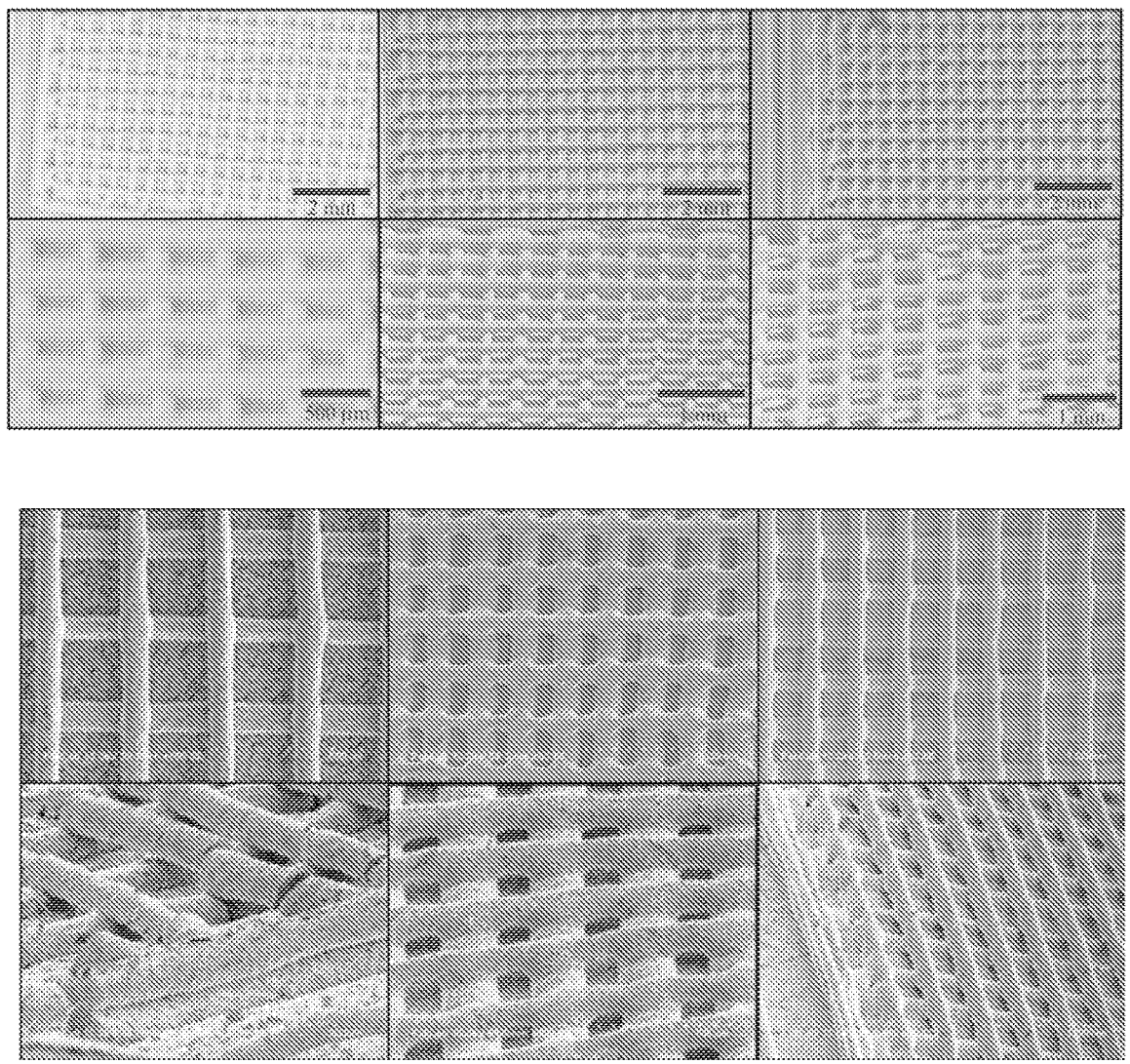
FIG. 13 shows photographs of as-printed (top) and SEM images of sintered (bottom) 3-D printed multilayer grid structures on garnet substrate.

Control over the 3D printing process has shown improvement through the successful prints of the 3D multilayer grid structures. Using these inks, overlaid orthogonal raster patterns were printed in 1×1 cm areas on garnet substrates as seen in FIG. 13 to create multilayer grid structures. Post sintered structures had line-to-line distances varying from 275 µm to ~315 µm with line thicknesses ranging from 90-200 µm.

Example 3

This example provides a description of solid-state electrolyte structures, devices comprising the solid-state electrolyte structures and characterization of same.

A symmetric cell made using the 3-D printed stacked array LLZ and lithium electrodes was fabricated to validate the efficacy of the 3-D printed electrolytes (FIG. 11). The electrolytes were printed according Example 1. An ALD coating was applied to both sides of the LLZ to allow wetting of the lithium to the LLZ surface. FIG. 11a shows a diagram of the cell structure and FIG. 11b shows a closeup of the lithium metal filling the pores of the LLZ stacked array structure. Intimate contact between the lithium and LLZ and increased contact area provided by the 3-D printed LLZ pattern ensure low lithium metal|LLZ electrolyte interfacial impedance.

FIG. 11c shows the symmetric DC cycling of the cell. The current density was varied from 0.1 mA/cm$^2$ to 0.33 mA/cm$^2$ and back down to 0.1 mA/cm$^2$. The average overpotential at 0.1 mA/cm$^2$ and 0.33 mA/cm$^2$ is 2.3 mV and 7.2 mV, both of which corresponds to an area specific resistance (ASR) of 22 Ω-cm$^2$. When the current density was reduced to 0.1 mA/cm$^2$, the average overpotential decreased back to 2.0 mV, which also equates to an ASR of 20 Ω-cm$^2$. The constant ASR, independent of current density, demonstrates the high conductivity of the 3-D printed LLZ. Furthermore, because the Li|LLZ interfacial impedance is negated by the ALD coating, the extremely low ASR also indicates the connections between all of the 3-D printed LLZ layers are seamless. Thus, the 3-D printed LLZ creates a continuous and multilayer ordered electrolyte architecture which maintains the ability to block dendrite propagation and the high conductivity that is characteristic of the LLZ electrolyte.

Li Infiltration and Symmetric Cell Testing. Sintered 3-D printed LLZ layers were first treated with an ALD surface coating to improve Li wetting and interfacial contact of the Li metal to the LLZ electrolyte. Li metal was then coated on both sides of the LLZ structures by melting at 200° C. in an Ar glovebox. The symmetric cell was packaged with stainless steel current collectors in a coin cell for testing on a BioLogic VMP3 potentiostat. Cells were cycled at 0.10-0.33 mA/cm$^2$ for 1 h at room temperature.

Example 4

This example provides a description of solid-state electrolyte structures, devices comprising the solid-state electrolyte structures and modeling of same.

Figure 14:
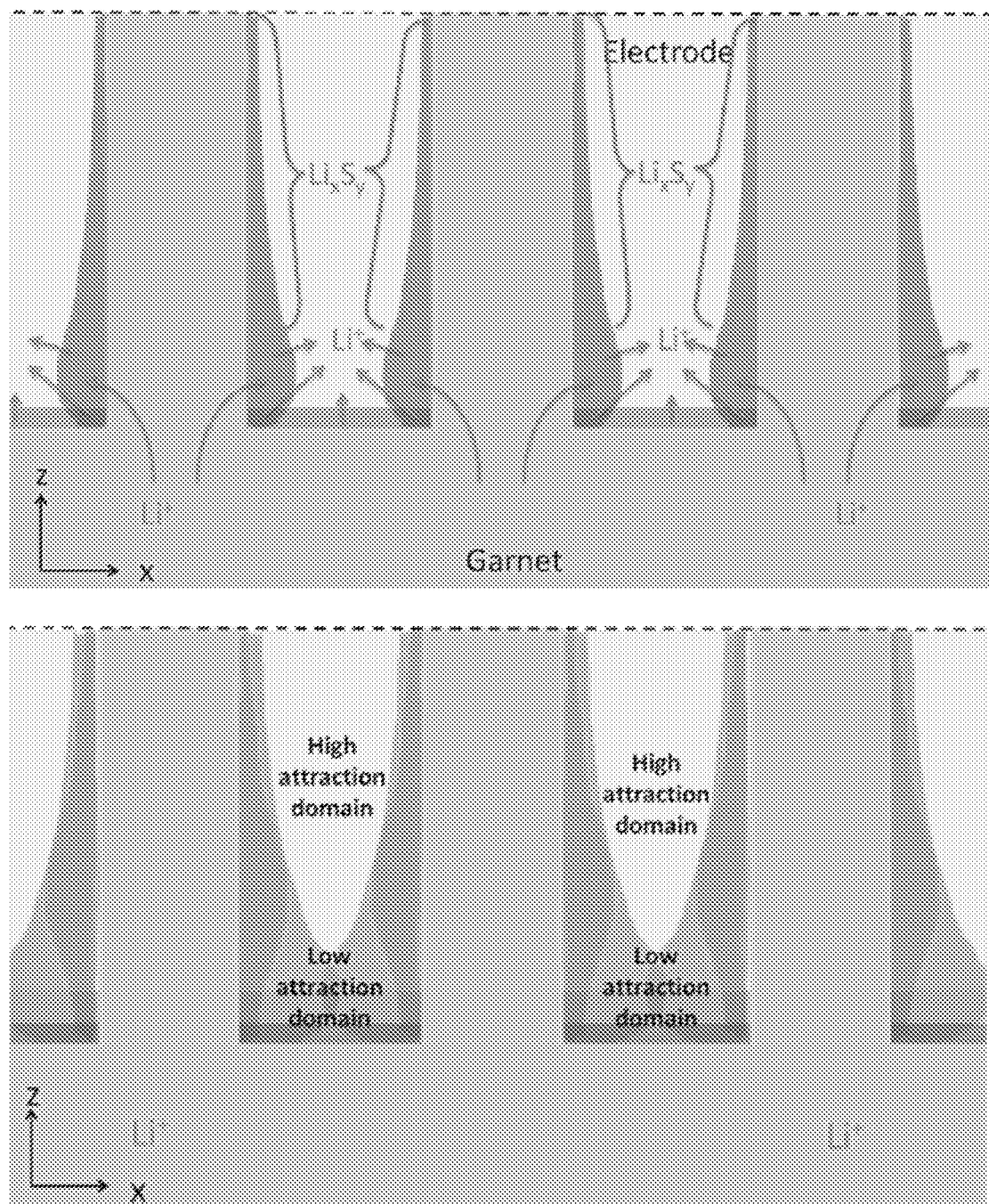
FIG. 14 shows a diagram of chemical diffusion (left) vs electrical migration (right).

Development of theoretical models to predict the performance of the Li—S full cell. Construction of a theoretical model to predict the performance of the 3-D printed structures and the transport properties began with a two-dimensional approach. FIG. 14 below shows the basic concepts used in the modeling of the column structures. The first component demonstrates the driving forces due to chemical concentration gradients and resulting diffusion. The second component is the electrical migration of ions caused by the electric field. These two components have somewhat different profiles which overlap to create the overall lithium concentration profile as a function of charge state.

Figure 15:
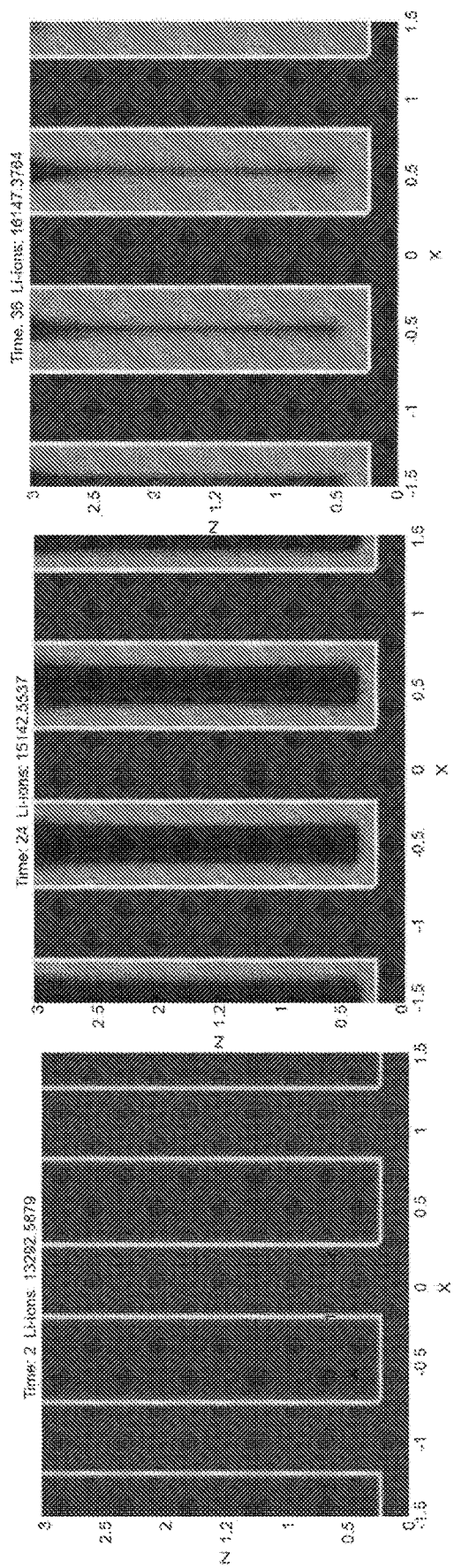
FIG. 15 shows visualization of the Li concentration within the electrode (initially dark blue) as the cell is discharged. The initial state (charged) is shown on the left and discharged towards the right.
Figure 16:
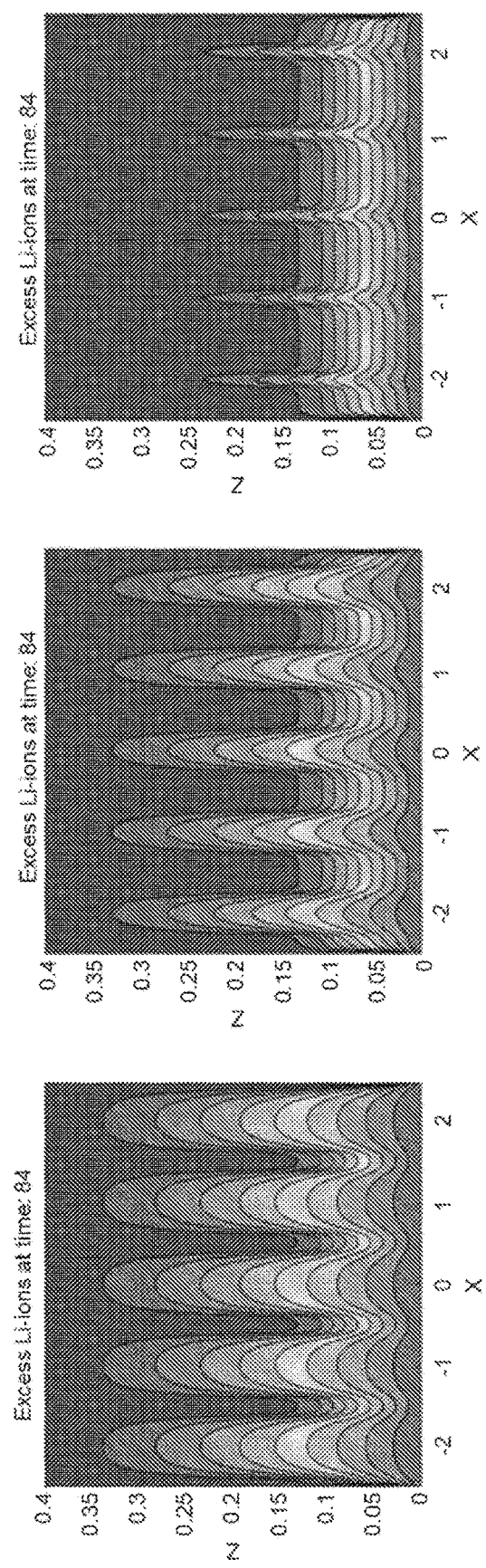
FIG. 16 shows a diagram of lithium transport within the garnet pillars during discharge.

FIG. 15 shows the concentration profile within the electrode between the garnet pillars as function of charge state. There is clearly a dependence on the height of the column as well as the column separation. FIG. 16 shows the lithium transport within the garnet pillars with varying pillar diameter, which also has an effect on the rate at which lithium can access the electrode.

This model tracks the movement of lithium ions through the electrolyte and sulfur electrode by considering the physical forces that affect each lithium ion—chemical diffusion and electromagnetic forces.

Chemical Diffusion

In thermodynamics, concentration-related diffusion is described with a probabilistic model of fluxes.

$$J = -D \nabla c$$

Where flux, J, is related to the first spatial derivative of concentration, c, by a diffusion coefficient D. When combined with an equation maintaining that mass is conserved in the system:

$$0 = \frac{\partial c}{\partial t} + \frac{\partial J}{\partial x}$$

The equation can be rewritten in the more recognizable heat-wave equation (Fick's second law).

$$\frac{\partial c}{\partial t} = D_c \nabla^2 c$$

Figure 17:
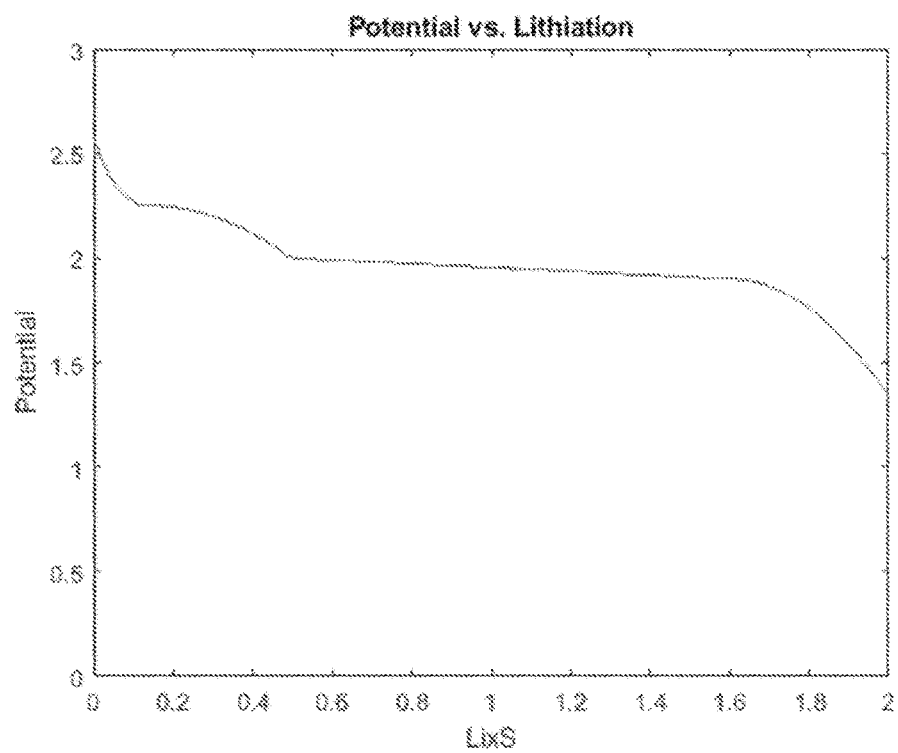
FIG. 17 shows a lithiation curve used to determine the potential of a given voxel as determined by the average lithium.

Electrical Diffusion. In addition to the random walks of particles in a concentration gradient, the lithium ions in our system also experience the pull of electric potentials. The potential at a specific point is determined by the stoichiometry of the electrode at that point, or the amount of lithium in the Lithium polysulfide. The potential of each polysulfide is determined experimentally and is shown in FIG. 17.

$$J_{electrical} = -\frac{DzF}{RT} c (\nabla \phi)$$

where z is the number of charges associated with the moving ion (z=1 for Li-ions), F is the Faraday constant, R is the ideal gas constant and ϕ is the electrochemical potential at a voxel. This potential of an entire voxel is determined by taking the lithium concentration in the voxel as an average for that area and assigning that potential to the lithiation contour in FIG. 17.

The total concentration change can be determined after combining all flux equations to a net flux term:

$$J_{net} = J_{chemical} + J_{electrical}$$

$$J_{net} = -\left[D \nabla c + \frac{DzF}{RT} c (\nabla \phi)\right]$$

$$\frac{\partial c}{\partial t} = D\left[\nabla^2 c + \frac{zF}{RT}(\nabla c \nabla \phi + c \nabla^2 \phi)\right]$$

This model utilizes a discrete, iterative approach to calculating the concentration of lithium ions, and in turn lithium polysulfides over the entire 3D volume.

Figure 18:
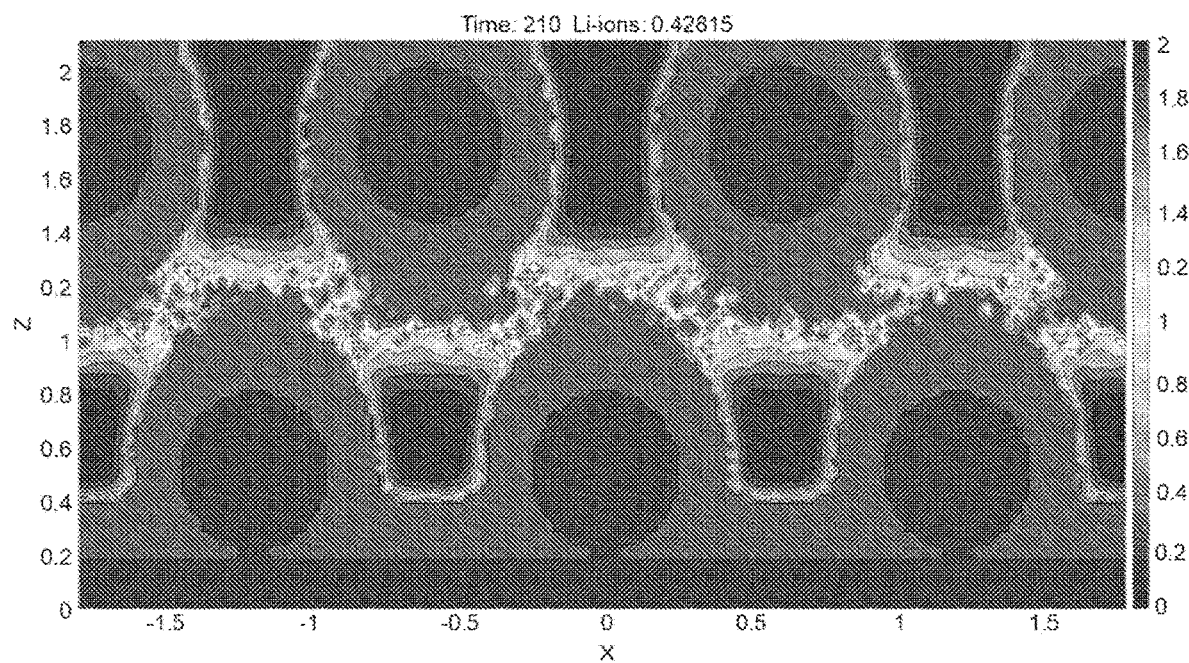
FIG. 18 shows an effect of electrolyte features on lithium transport in a layered grid structure.

First, a 3D array is created where each cell represents one of thousands of cubic voxels. Each cell is populated with an object that stores information that pertains to that position such as the material that is most prevalent (electrode or electrolyte), the amount of lithium, the charge associated with that lithiation, and the diffusion coefficient. This array is then evaluated cell-by-cell, considering the effect that nearest-neighbors sites have on ion motion into and out of the cell in question. These changes are then applied to every cell in an iterative fashion. The evaluation and application are separated into two different processes to avoid any issues with delay of information propagation. This process is shown in FIG. 18.

Initial lithium concentrations are 0 for electrode domains and 6.75 for electrolyte domains as dictated by stoichiometry. After considering the relative densities of sulfur and garnet, the number maximum of lithium atoms contained in a given voxel are comparable.

Continuous to a discrete model. Any jump from a continuous model to a discrete one will come with a small amount of over/under estimation; however, the dynamics and core concepts behind the model will remain the same. In our equation for concentration there are five continuous components that need to be made discrete—the time step, dt, the first and second order spatial derivatives of concentration, $\nabla c$ and $\nabla^2 c$; and the first and second order spatial derivatives of potential, $\nabla \phi$ and $\nabla^2 \phi$. Breaking up the calculations into an iterative algorithm automatically sets the time step. Because information about concentrations travels one block at a time, the rate-limiting step is dependent on the number and therefore size of the blocks. The higher spatial resolution the model is, the smaller each time step, dt.

The process of transforming a continuous space to a discrete space is relatively straightforward. For any given characteristic, v, in one dimension:

$$\nabla v \stackrel{1D}{=} \frac{d}{dx} v$$

$$\nabla^2 v \stackrel{1D}{=} \frac{d}{dx}\left(\frac{d}{dx} v\right)$$

where, if dx=1 for a unit size:

$$\frac{dv(x)}{dx} = \frac{v(x+1) - v(x) + v(x) - v(x-1)}{2\,dx}$$

$$dv = \frac{1}{2}(v(x+1) - v(x-1))$$

$$\frac{d}{dx}\left(\frac{d}{dx} v\right) = \frac{d}{dx}\left(\frac{v(x+1) - v(x) + v(x) - v(x-1)}{2\,dx}\right)$$

$$d^2 v = v(x-1) + v(x+1) - 2v(x)$$

The same process can be used for any Cartesian coordinate and is scaled to higher dimensions by linearly combining the equations for each additional dimension. In 3D, these derivatives can be treated as arrays:

$$\nabla_{3D} = \begin{bmatrix} 0 & 0 & 0 \\ 0 & -0.5 & 0 \\ 0 & 0 & 0 \end{bmatrix}_{-1}, \begin{bmatrix} 0 & 0.5 & 0 \\ -0.5 & 0 & 0.5 \\ 0 & -0.5 & 0 \end{bmatrix}_{0}, \begin{bmatrix} 0 & 0 & 0 \\ 0 & 0.5 & 0 \\ 0 & 0 & 0 \end{bmatrix}_{1}$$

$$\nabla^2_{3D} = \begin{bmatrix} 0 & 0 & 0 \\ 0 & 1 & 0 \\ 0 & 0 & 0 \end{bmatrix}_{-1}, \begin{bmatrix} 0 & 1 & 0 \\ 1 & -6 & 1 \\ 0 & 1 & 0 \end{bmatrix}_{0}, \begin{bmatrix} 0 & 0 & 0 \\ 0 & 1 & 0 \\ 0 & 0 & 0 \end{bmatrix}_{1}$$

Figure 19:
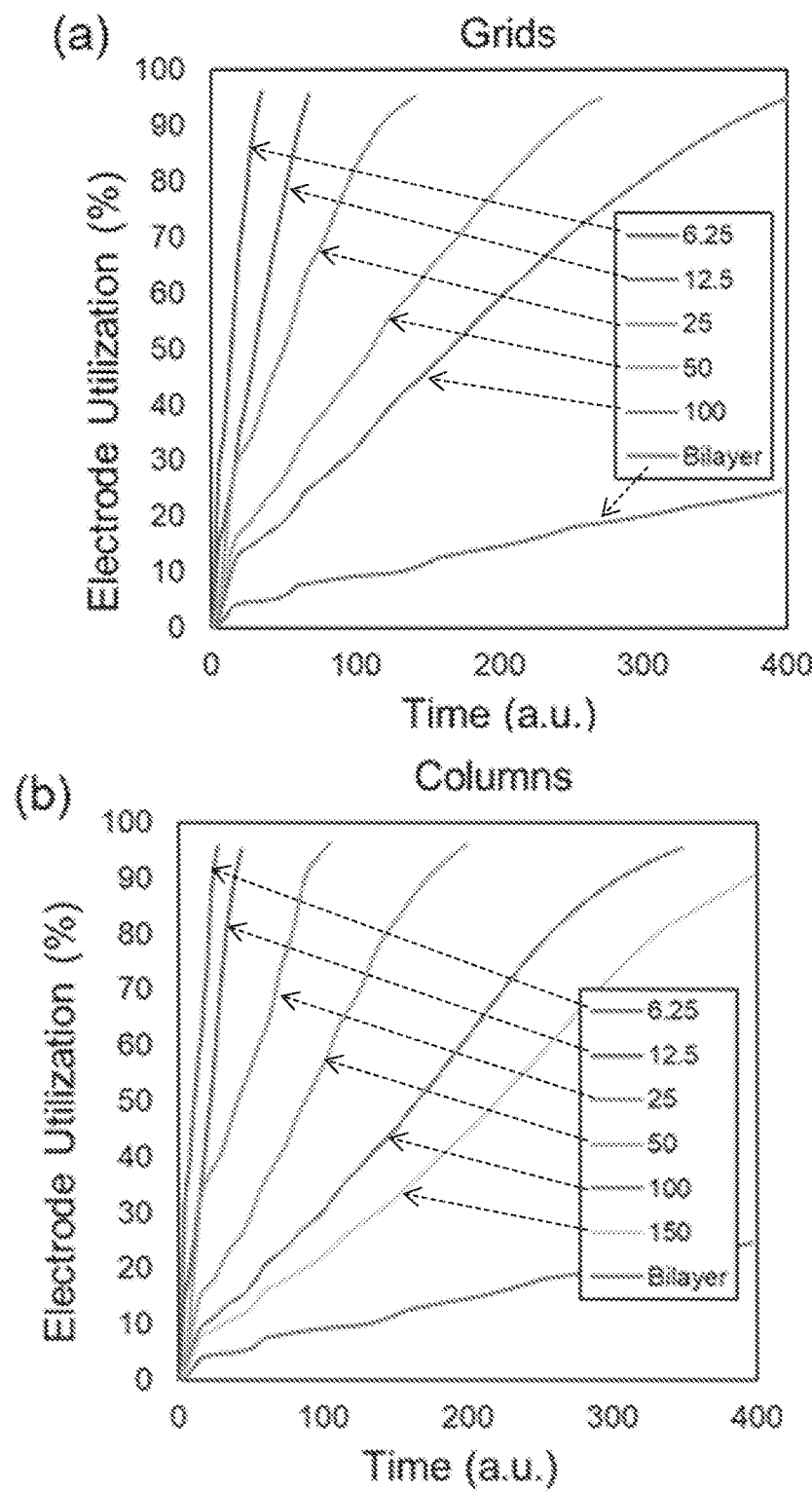
FIG. 19 shows modeling of electrode lithiation as a function of time using a fixed electrode loading (by fixing 85% electrolyte structure porosity and 200 μm height) and varying feature diameters for the (a) grid and (b) column structures. (c) Relative (charge/discharge) C rate of these structures as function of feature diameter.
Figure 19:
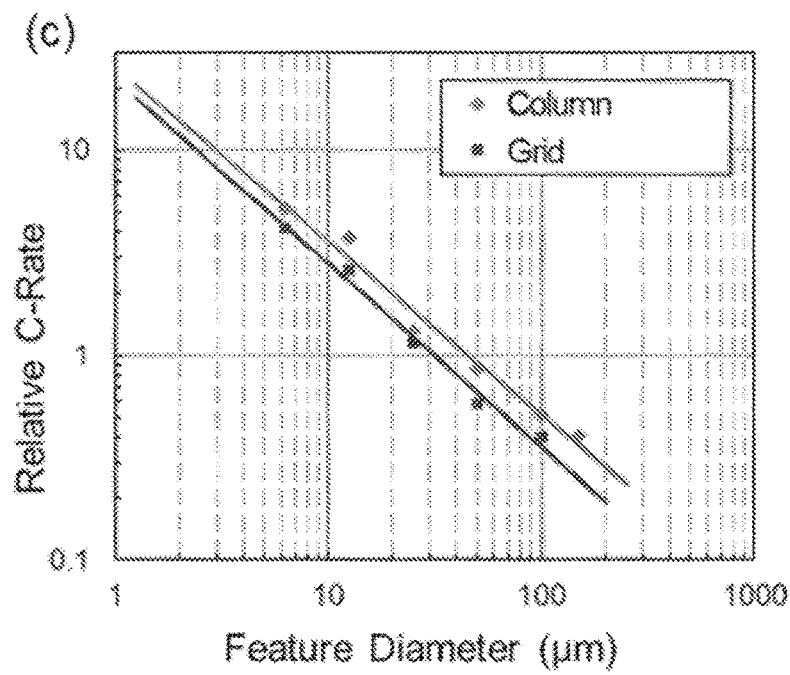

The relation between discharge rate and printed feature size was simulated, using a fixed porosity of 85% and cathode thickness of 200 μm. These values fix the cathode loading, and thus the energy density. Based on modeled cell design parameters this is projected to be 900 Wh/kg. The model results, shown in FIG. 19, are useful in this case to determine what structure and dimensions are needed to achieve sufficient power densities for this thickness of cathode. For comparison, a bilayer (flat surface with no 3-D printed structure) was also modeled and included in FIG. 19. Overall, the models show that any printed structure utilizes the electrode at a much faster rate than a bilayer, and that as feature sizes decrease electrode utilization rate correspondingly increases. Further analysis of the relative power density is shown in FIG. 19c, which plots the relative C-rate as a function of feature diameter using a bilayer (generally limited to C/10) as the baseline. The results suggest that in general the columns have somewhat higher power density than the grid structures, as they provide more direct ion pathways across the cell. Additionally, with feature diameters below ~30 μm C-rates >1 are attainable, and below 10 μm, rates over 3C is possible. Smaller features have clear advantages for cell performance.

Figure 20:
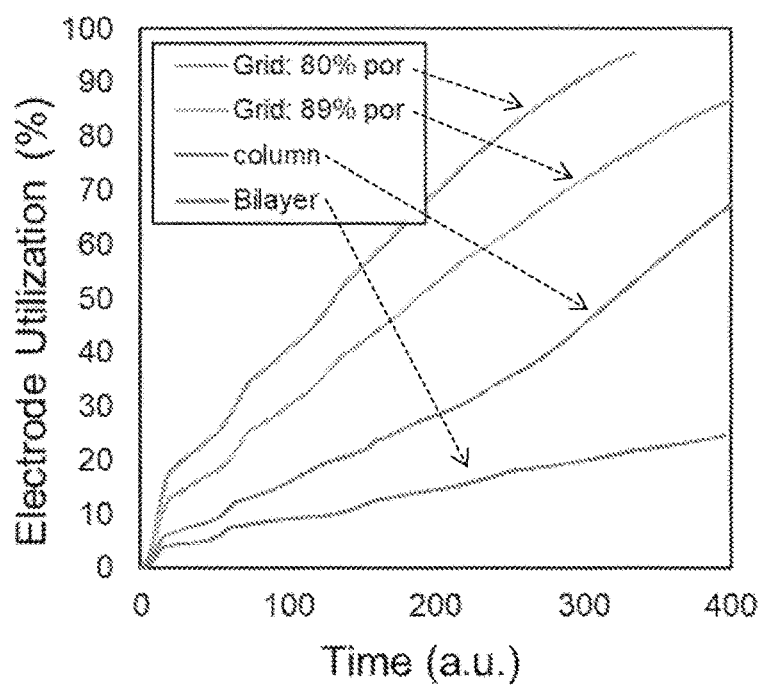
FIG. 20 shows modeling of select demonstrated 3D-garnet structures: 2-layer grid structures with 75 μm feature diameter and 300 μm and 500 μm spacing (80 and 89% porosity, respectively), column structure with 150 μm diameter, 225 μm height, and 500 μm spacing (93% porosity), and a bilayer for comparison.

FIG. 20 shows the modeling results for some of the 3-D printed structures that have been demonstrated thus far. Specifically, grid structures with 75 μm line diameters and 2-layer height (150 μm) with line-to-line spacing of 300 and 500 μm, resulting in layer porosity of 80% and 89%, respectively; a column structure with 150 μm diameter columns with 225 μm height, and column separation of 500 μm (93% porosity), along with a bilayer for comparison. These results clearly demonstrate the benefit of the 3-D printed structures to power density, it is also worth noting that theoretical energy density in each of these cases is projected to be 700-1000 Wh/kg.

Example 5

This example provides a description of solid-state electrolyte structures, devices comprising the solid-state electrolyte structures and characterization of same, methods of making solid-state electrolyte structures.

Figure 21:
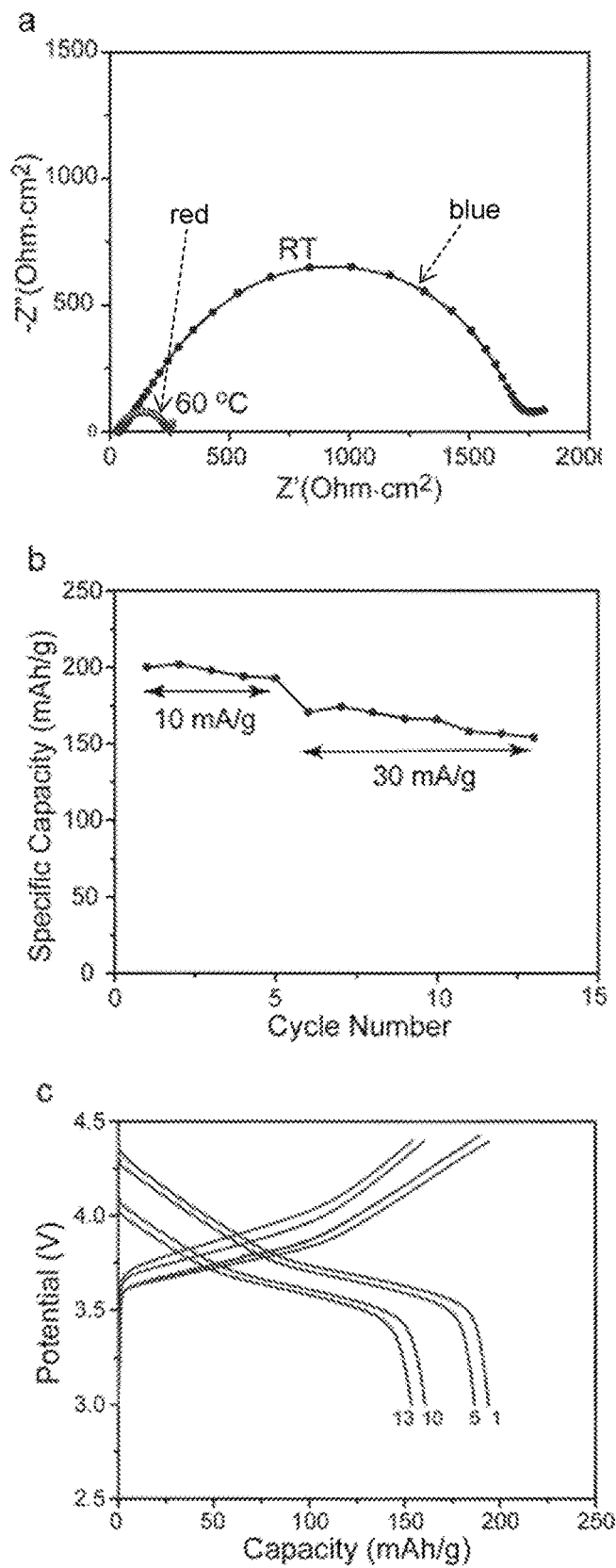
FIG. 21 shows electrochemical performance of Li-NMC battery at 60° C. using a 2-layer grid structure on the cathode side with mass loading of about 14 mg/cm² NMC and a current density of 10-30 mA/g. (a) EIS of the full cell at room temperature (blue) and at 60° C. (red). (b) Discharge capacity vs cycle number. (*c*) Voltage profiles of select cycles 1 and 5 (10 mA/g), as well as 10 and 13 (30 mA/g).

A full cell using commercial NMC cathode was fabricated as follows: Using a non-Newtonian ink of garnet particles, a 2-layer garnet grid structure was 3-D printed as described herein on the dense layer of a porous-dense bilayer garnet electrolyte. The structure was then sintered, fusing the grid particles together and to the bilayer. The lines composing the grid structure have diameters of approximately 75 μm and a horizontal center-to-center spacing of 385 μm, equating to a layer porosity of 85%. Li metal was filled into the random porous layer on backside of the bilayer, while commercial 811 NMC powder, PVDF, and carbon black were filled into the grid structure with NMP as solvent. The total NMC loading was 14 mg/cm². The cell cycling results are shown in FIG. 21. The impedance measurements of our first cell in FIG. 21a show a high resistance at room temperature that drops dramatically when heated to 60° C., a temperature at which solid state batteries are quite stable. At a charge/discharge rate of C/20 (10 mA/g) a near theoretical discharge capacity (200 mAh/g) of 185 mAh/g is achieved. After five cycles, the rate was increased to C/7 (30 mA/g) and capacity decreased slightly to 170 mAh/g (due to cathode liquid vaporization).

Although the present disclosure has been described with respect to one or more particular embodiments and/or examples, it will be understood that other embodiments and/or examples of the present disclosure may be made without departing from the scope of the present disclosure.

The invention claimed is:

1. A solid-state electrolyte structure, comprising:
a substrate of a first ion-conducting material and having a first surface, wherein the first ion-conducting material is a first solid-state ion-conducting electrolyte material; and
a non-planar first ordered porous microstructure disposed on a first surface of the substrate, the first ordered porous microstructure comprising a second ion-conducting material, and the second ion-conducting material is a solid-state, ion-conducting electrolyte material; and
wherein the first ordered porous microstructure comprises a plurality of columns arranged in a two-dimensional array.

2. The solid-state electrolyte structure of claim 1, wherein the second ion-conducting material is the same as the first ion-conducting material.

3. The solid-state electrolyte structure of claim 1, wherein the substrate has a second surface opposite the first surface, and the solid-state electrolyte structure further comprises a second ordered porous microstructure disposed on the second surface of the substrate, and the second ordered porous microstructure comprising a third ion-conducting material that is a third solid-state, ion-conducting electrolyte material.

4. The solid-state electrolyte structure of claim 3, wherein the third ion-conducting material is the same as the first ion-conducting material and/or the second ion-conducting material.

5. The solid-state electrolyte structure of claim 3, wherein the second ordered porous microstructure comprises a plurality of columnar structures, a line structure, a grid structure, or a multilayer grid structure.

6. The solid-state electrolyte structure of claim 1, wherein the second ion-conducting material is a lithium-ion-conducting material, sodium-ion-conducting material, or magnesium-ion-conducting material or an ion-conducting polymeric material.

7. The solid-state electrolyte structure of claim 6, wherein the lithium-ion-conducting material is a lithium-garnet material, the sodium-ion-conducting material is $Na_3Zr_2Si_2PO_{12}$ (NASICON) or beta-alumina or cation-doped NASICON, and the magnesium-ion-conducting material is $Mg_{1+x}(Al,Ti)_2(PO_4)_6$, or $MgZr_4P_6O_{24}$ or NASICON-type magnesium-ion-conducting materials.

8. The solid-state electrolyte structure of claim 1, further comprising a cathode material or an anode material disposed on at least a portion of the first ordered porous microstructure.

9. The solid-state electrolyte structure of claim 8, wherein the cathode material is sulfur, air, or oxygen, or is a lithium-containing cathode material, a sodium-containing cathode material, or a magnesium-containing cathode material.

10. The solid-state electrolyte structure of claim 8, wherein the solid-state electrolyte structure comprises the anode material, and the anode material is a metal anode.

11. An electrochemical device comprising one or more solid-state electrolyte structure of claim 1, wherein the electrochemical device is a solid-state, ion-conducting battery comprising:
a cathode material or an anode material forming a cathode electrode or an anode electrode, respectively;
the solid-state electrolyte structure of claim 1, wherein the cathode material or the anode material is disposed on at least a portion of the ordered porous region of the solid-state electrolyte structure, and
a current collector disposed on at least a portion of the cathode material or the anode material.

12. A method of making the ordered porous solid state electrolyte structure of claim 1, the method comprising:
a) depositing a solid state electrolyte precursor material to form a first layer of the solid state electrolyte precursor material disposed on a dense layer such that a first layer of ordered solid state electrolyte precursor material disposed on the dense layer is formed;
b) optionally, depositing a second layer of solid state electrolyte precursor material such that at a second layer of ordered solid state electrolyte precursor material is formed, wherein the second layer of ordered solid state electrolyte material is disposed on a least a portion of the first layer of ordered porous solid state material;
c) optionally, waiting a predetermined amount of time and/or heating the layer;
d) optionally, repeating the depositing from b), and, optionally, the waiting from c), a desired number of times; and
e) optionally, drying the layer(s) of ordered solid state electrolyte precursor material after all of the solid state electrolyte precursor material layers are deposited; and
f) heating the dried layer(s) of ordered solid state electrolyte precursor material to form the first ordered porous microstructure.

13. The solid-state electrolyte structure of claim 1, wherein the second ion-conducting material is different from the first ion-conducting material.

14. The method of claim 12, wherein the heating is sintering.

* * * * *